US008040854B2

(12) United States Patent
Furueda et al.

(10) Patent No.: US 8,040,854 B2
(45) Date of Patent: Oct. 18, 2011

(54) OFDM WIRELESS COMMUNICATION METHOD AND WIRELESS COMMUNICATION APPARATUS

(75) Inventors: Koichiro Furueda, Yokohama (JP);
Mikio Kuwahara, Yokohama (JP);
Atsuhiko Sato, Yokohama (JP); Ichiro Murata, Yokohama (JP)

(73) Assignee: Hitachi, Ltd., Tokyo (JP)

(*) Notice: Subject to any disclaimer, the term of this patent is extended or adjusted under 35 U.S.C. 154(b) by 581 days.

(21) Appl. No.: 11/964,979

(22) Filed: Dec. 27, 2007

(65) Prior Publication Data
US 2008/0279124 A1    Nov. 13, 2008

(30) Foreign Application Priority Data

Dec. 27, 2006  (JP) ................................. 2006-350845
Oct. 5, 2007   (JP) ................................. 2007-261522

(51) Int. Cl.
*H04W 4/00*          (2009.01)
(52) U.S. Cl. ........ 370/334; 370/208; 370/329; 370/330; 370/331; 370/332
(58) Field of Classification Search ........................ None
See application file for complete search history.

(56) References Cited

U.S. PATENT DOCUMENTS

| 7,333,056 | B2 * | 2/2008 | Kishigami et al. | 342/417 |
| 7,436,758 | B2 * | 10/2008 | Suh et al. | 370/203 |
| 2004/0081123 | A1 * | 4/2004 | Krishnan et al. | 370/329 |
| 2005/0058097 | A1 * | 3/2005 | Kang et al. | 370/329 |

OTHER PUBLICATIONS

"Working Group on Mobile Broadband Wireless Access", IEEE C802. 20-06/04.
"3rd Generation Partnership Project; Technical Specification Group Radio Access Network; Physical Layer Aspect for Evolved Universal Terrestrial Radio Access (UTRA)", 3GPP TR 25. 814 V7.0.0 (Jun. 2006).
"Framework Proposal for LBC Mode of Rev C", 3GPP2 C30—Jun. 26, 2006—054R2.

* cited by examiner

*Primary Examiner* — Donald Mills
(74) *Attorney, Agent, or Firm* — Antonelli, Terry, Stout & Kraus, LLP.

(57) ABSTRACT

In a wireless communication system wherein at least two communication units employ the TDD wireless communication method based on OFDMA, an OFDM wireless communication method and a wireless communication apparatus are disclosed. The first communication unit transmits a pilot signal over the whole subband zone configured of divisions of a predetermined system band. The second communication unit having a plurality of antennas estimates a propagation path of the subchannels constituting continuous frequency blocks making up a subband from the pilot signal received. The second communication unit determines the array weight used at the time of signal transmission to the first communication unit using the estimation result.

5 Claims, 40 Drawing Sheets

FIG. 7

| SLOT INTERVAL | UP LINK | | | | DOWN LINK | | | | TIME (msec) |
|---|---|---|---|---|---|---|---|---|---|
| | 1 | 2 | 3 | 4 | 1 | 2 | 3 | 4 | |
| 1 | | | | | 1 | 2 | 3 | 4 | 5 |
| 2 | | | | | 5 | 6 | 7 | 8 | 10 |
| 3 | | | | | 9 | 10 | 11 | 12 | 15 |
| 4 | | | | | 13 | 14 | 15 | 16 | 20 |
| 5 | | | | | 17 | 18 | 19 | 20 | 25 |
| 6 | | | | | 21 | 22 | 23 | 24 | 30 |
| 7 | | | | | 25 | 26 | 27 | 28 | 35 |
| 8 | | | | | 29 | 30 | 31 | 32 | 40 |
| 9 | | | | | 33 | 34 | 35 | 36 | 45 |
| 10 | | | | | 37 | 38 | 39 | 40 | 50 |
| 11 | | | | | 41 | 42 | 43 | 44 | 55 |
| 12 | | | | | 45 | 46 | 47 | 48 | 60 |
| 13 | | | | | 49 | 50 | 51 | 52 | 65 |
| 14 | | | | | 53 | 54 | 55 | 56 | 70 |
| 15 | | | | | 57 | 58 | 59 | 60 | 75 |
| 16 | | | | | 61 | 62 | 63 | 64 | 80 |
| 17 | | | | | 65 | 66 | 67 | 68 | 85 |
| 18 | | | | | 69 | 70 | 71 | 72 | 90 |
| 19 | | | | | 73 | 74 | 75 | 76 | 95 |
| 20 | | | | | 77 | 78 | 79 | 80 | 100 |

701

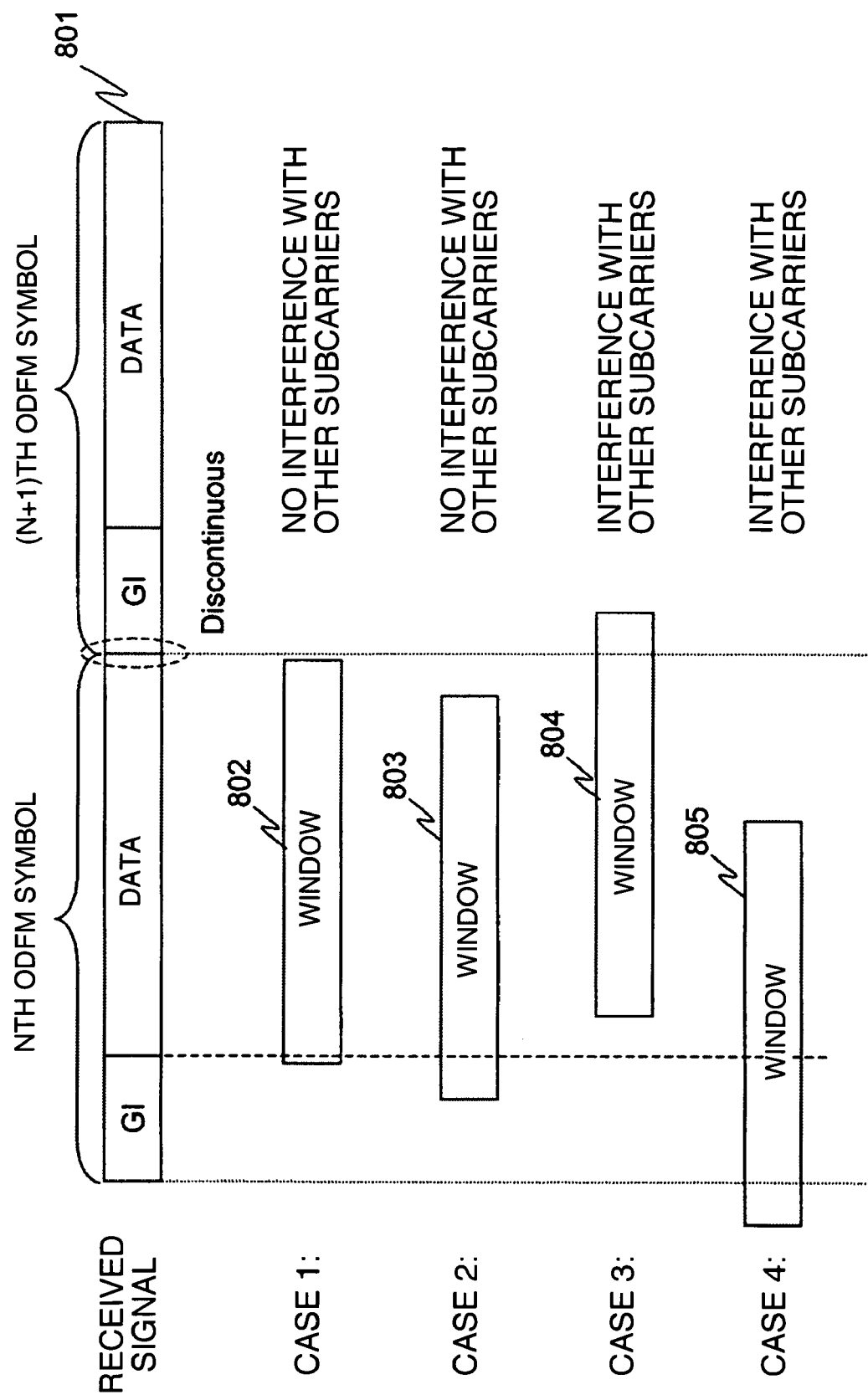

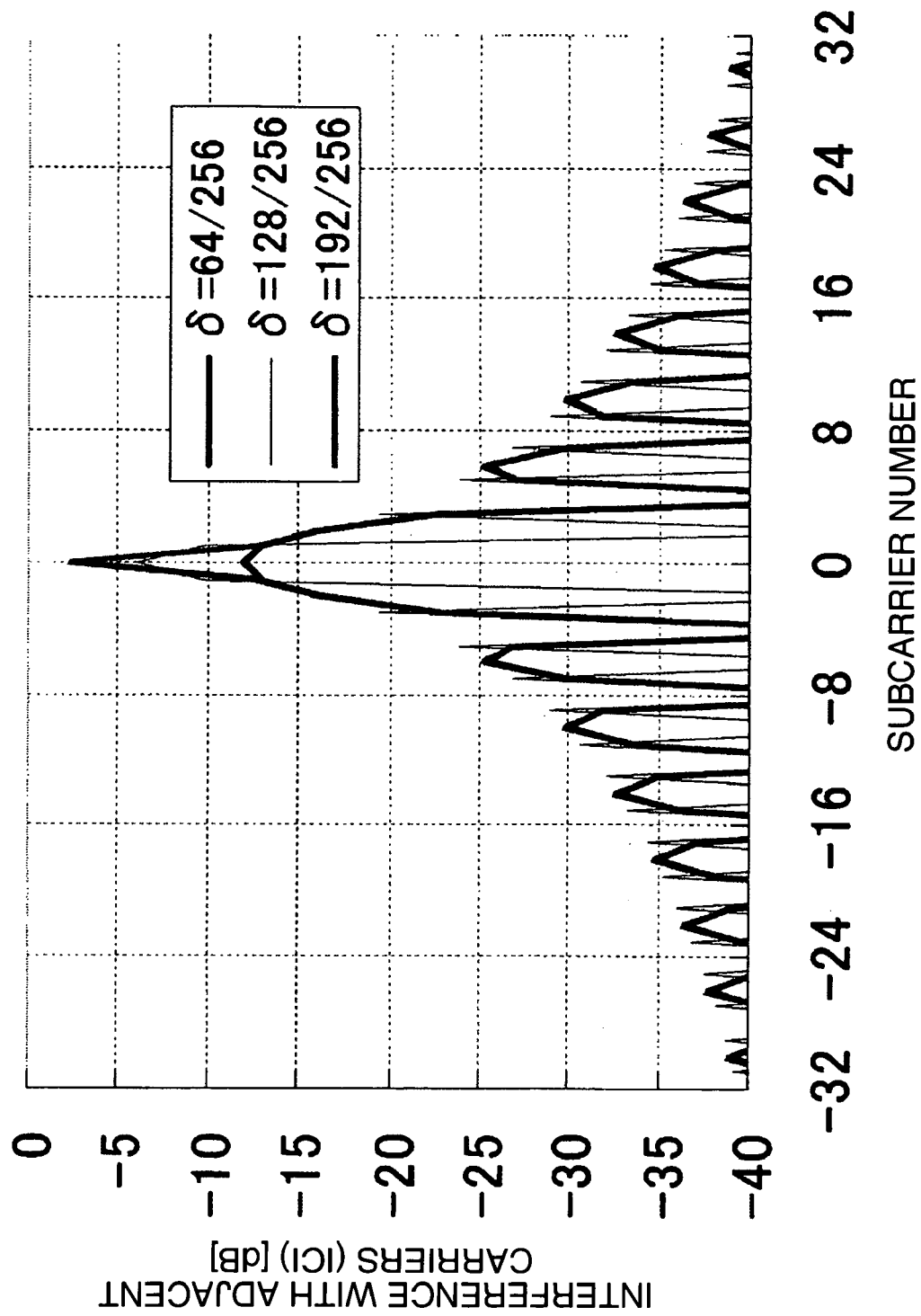

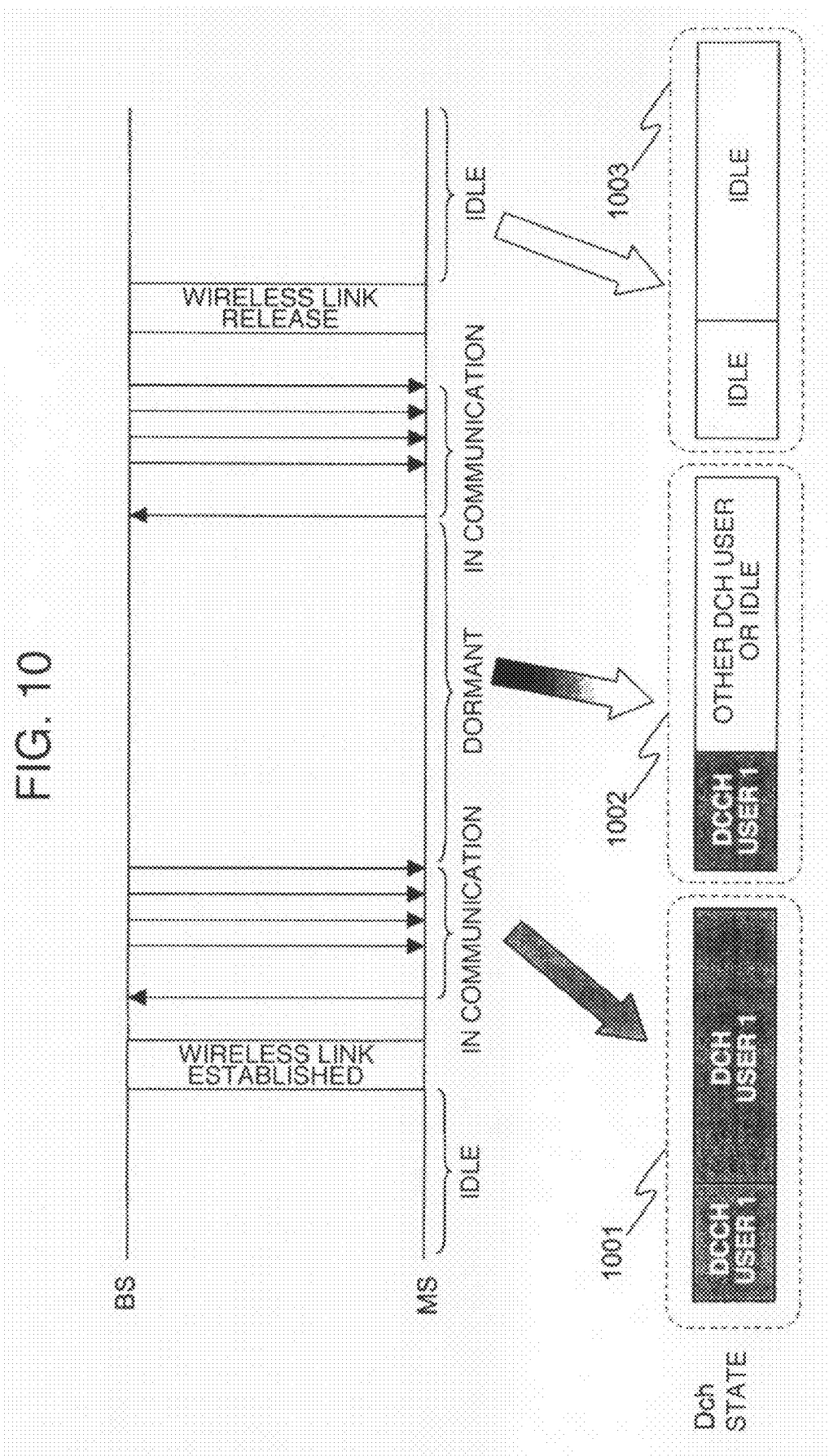

SB: Sub-band (1.275MHz)

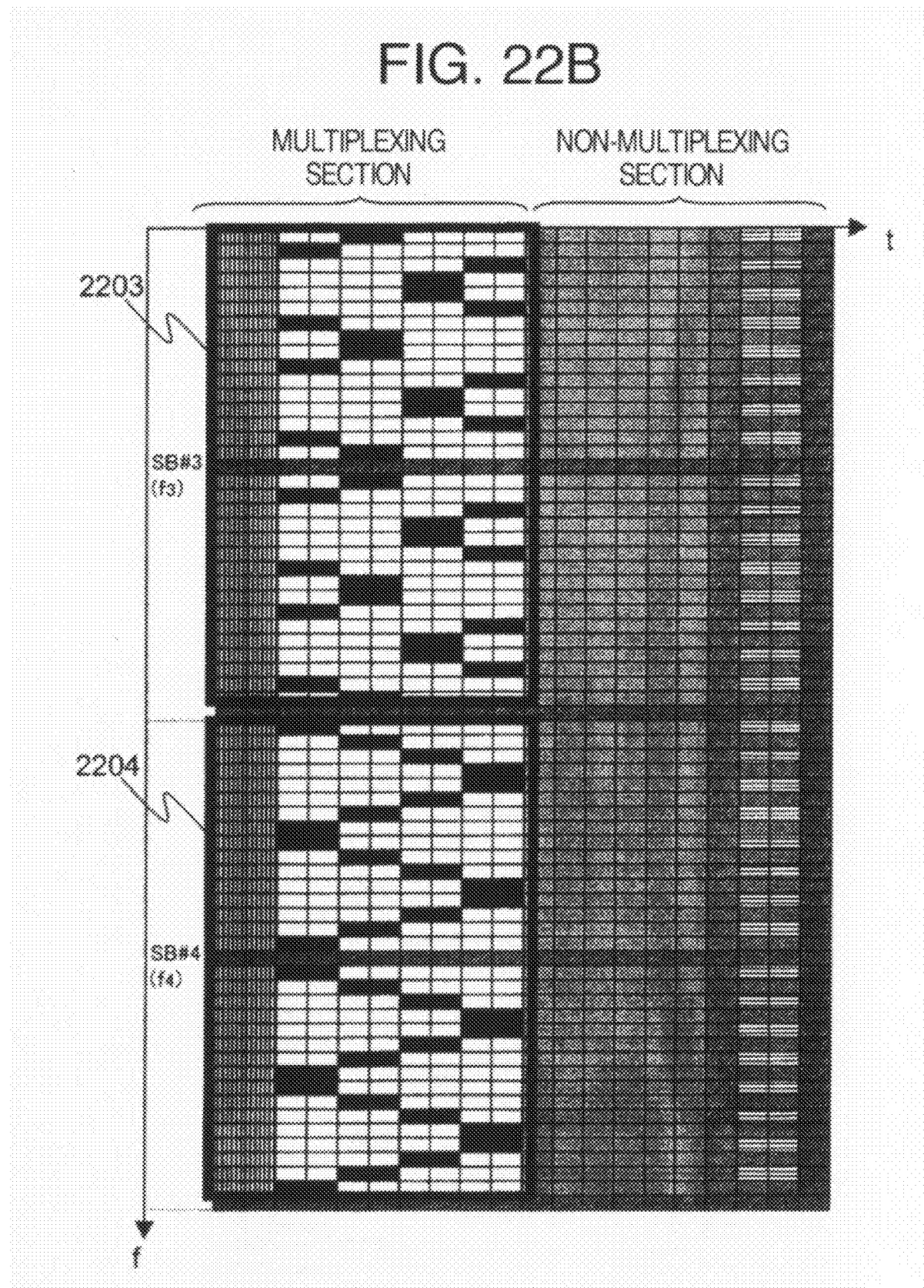

N = 15
PN CODE LENGTH = 32767

PN CODE = $2^N-1$

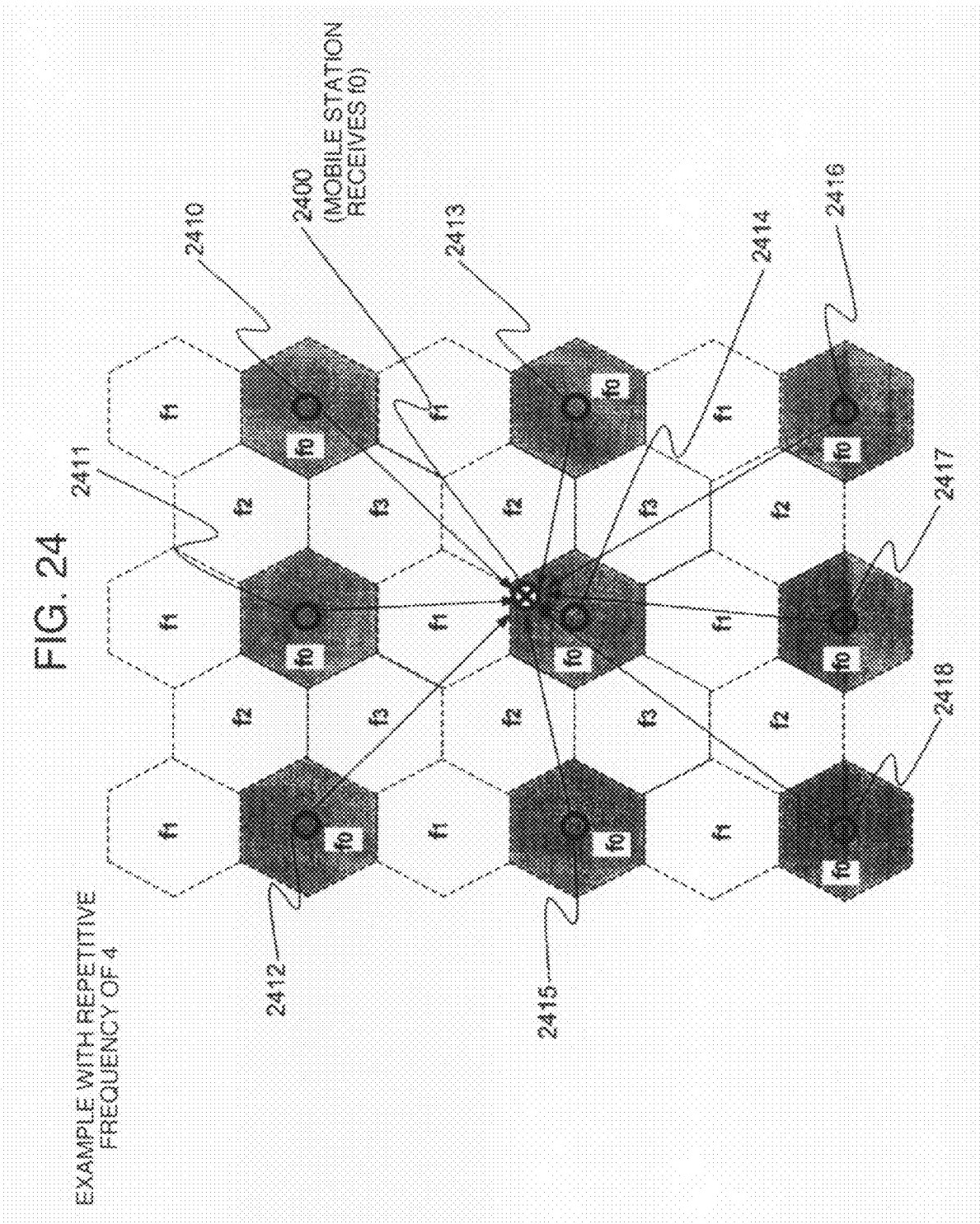

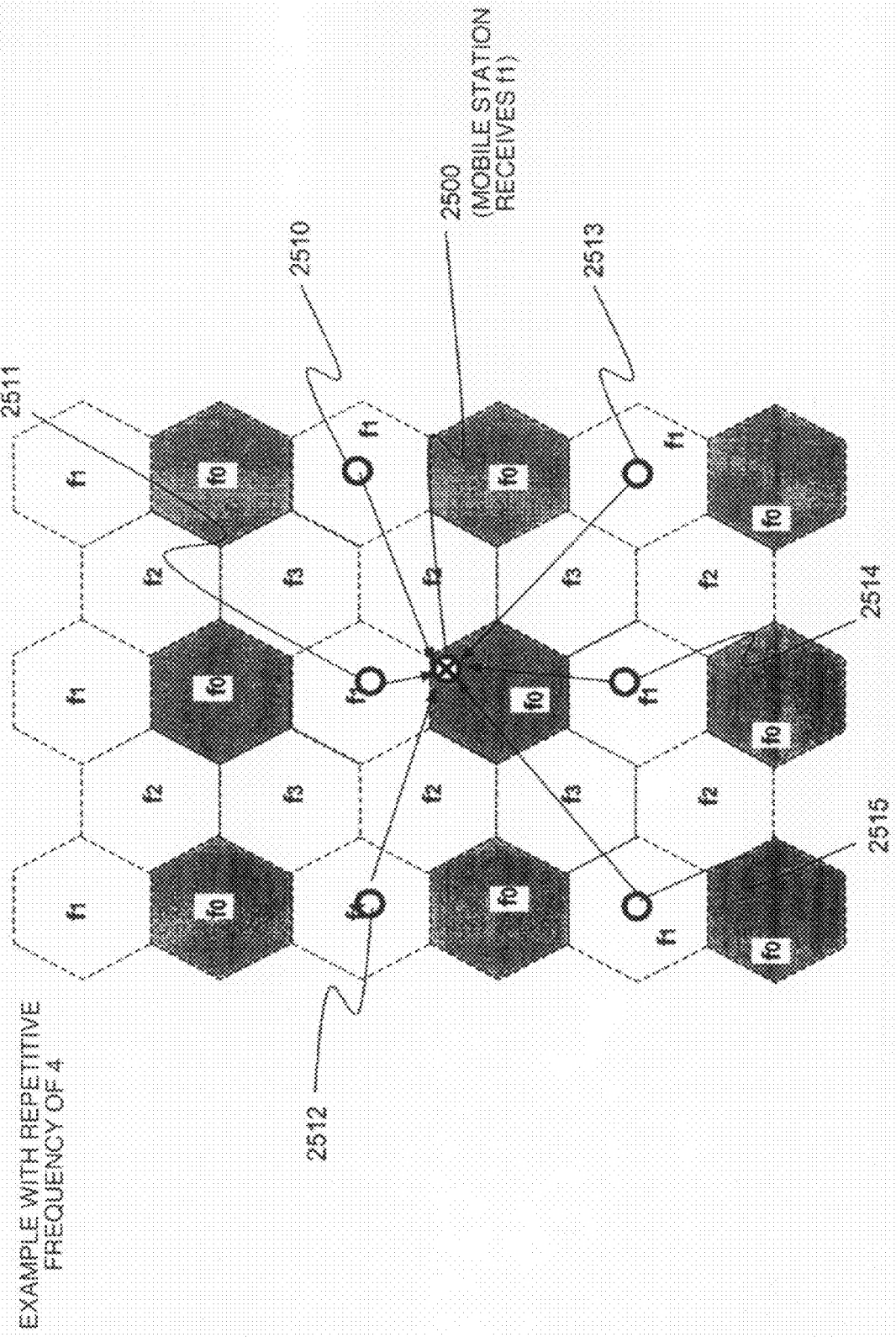

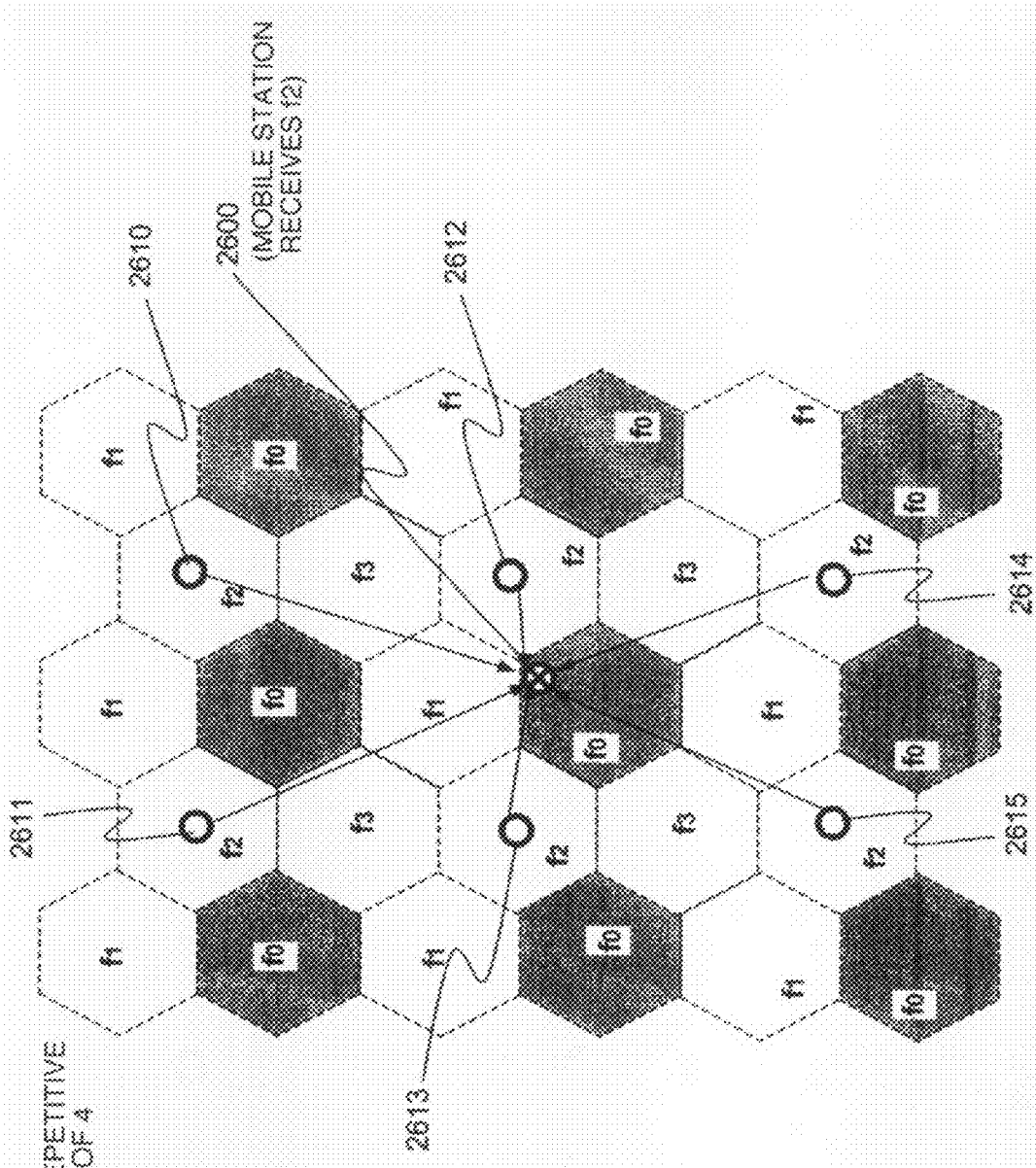

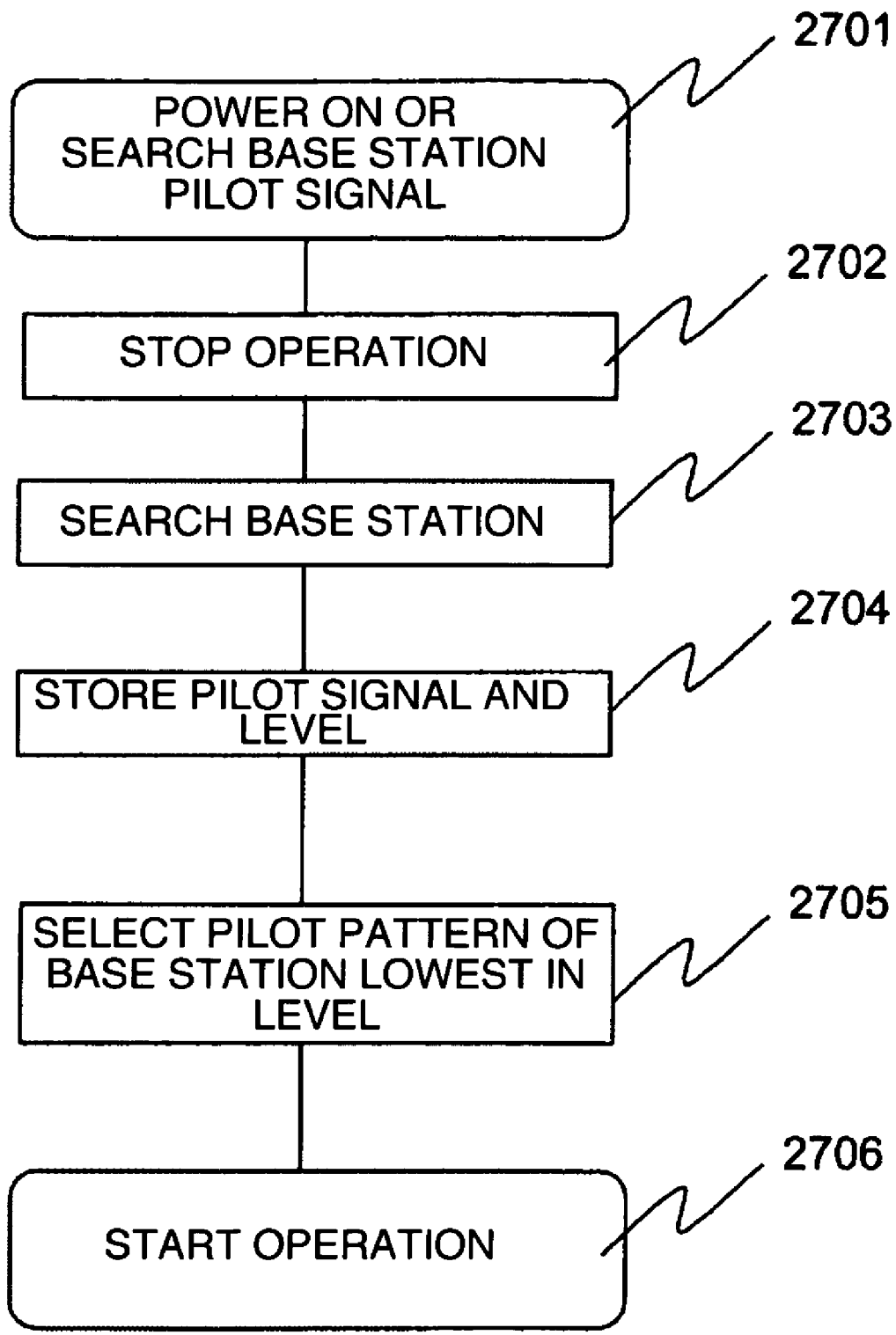

MF: MATCHED FILTER

D: DELAY CIRCUIT

An: Tap COEFFICIENT

FIG. 30

| FREQUENCY | BASE STATION #1 | | BASE STATION #2 | | BASE STATION #3 | | BASE STATION #4 | |
|---|---|---|---|---|---|---|---|---|
| | PILOT PATTERN | CCH DATA | PILOT PATTERN | CCH DATA | PILOT PATTERN | CCH DATA | PILOT PATTERN | CCH DATA |
| f1 | PATTERN A | TRANSMIT | PATTERN B | - | PATTERN C | - | PATTERN D | - |
| f2 | PATTERN A | - | PATTERN B | TRANSMIT | PATTERN C | - | PATTERN D | - |
| f3 | PATTERN A | - | PATTERN B | - | PATTERN C | TRANSMIT | PATTERN D | - |
| f4 | PATTERN A | - | PATTERN B | - | PATTERN C | - | PATTERN D | TRANSMIT |

CCH : CONTROL CH

MOD :Modulator
PN :Pseudo-noise coder
MAP :Mapping
IFFT:Inverse fast Fourier transform
RF:Radio Frequency

OFDM WIRELESS COMMUNICATION METHOD AND WIRELESS COMMUNICATION APPARATUS

CLAIM OF PRIORITY

The present application claims priority from Japanese application JP2006-350845 filed on Dec. 27, 2006 the content of which is hereby incorporated by reference into this application.

BACKGROUND OF THE INVENTION

The present invention relates to a wireless communication method and a wireless communication apparatus, or in particular a technique for realizing the cellular communication with the orthogonal frequency division multiple access (OFDMA) by employing the orthogonal frequency division multiplexing (OFDM).

In the wireless communication, the number of frequency resources available for use is limited, and therefore, a key playing a great role in realizing a system is how to achieve a high frequency utilization efficiency and a high communication speed. With this as a background, the research and development are under way for the wireless communication technique employing OFDM making possible the user scheduling even in frequency domain. In OFDM, the data to be transmitted is generated in frequency domain, and converted into a signal in time domain by IFFT (inverse fast Fourier transform) and transmitted as a wireless signal. At the receiving end, the signal in time domain is converted into a signal in frequency domain by FFT (fast Fourier transform) and the original signal is retrieved. In conducting the communication, control channels such as an access channel for establishing a link for the up link, a wireless control channel for transmitting the control information of the down link and up link and a broadcast channel for notifying the information on channel allotment and the system are required in addition to the data channel for data transmission.

The standardization organization IEEE802.20 has proposed a wireless scheme based on OFDM, and according to IEEE C802.20-06/04, the down link wireless control channel for transmitting the control information for the down link is defined. Also, the standardization organization 3GPP proposes a wireless scheme based on OFDM as LTE (long term evolution), and according to 3GPP TR 25.814 V7.0.0 (2006-06), the down link wireless control channel described above is defined. Further, the standardization organization 3GPP2 proposes a wireless scheme based on OFDM as LBC (loosely backward compatible), and according to 3GPP2 C30-20060620-054R2, the down link wireless control channel for transmitting the down link control information is defined.

The wireless control channel for the wireless communication schemes including and before the code division multiple access (CDMA) is always separated into the data channel and the control channel by time division, frequency division or code division. In the CDMA communication scheme, for example, a plurality of channels are transmitted at the same time by a diffused code, and at the receiving end, the required information can be retrieved by the inverse diffusion operation using a specified code. In this scheme, the diffused code allotted to the control channel is predetermined.

In the third-generation mobile communication now under development, on the other hand, the trend has changed toward the communication in which all information are carried on IP. In keeping with this trend, the broadband system has become a common practice and various forms of information are required to be exchanged in the next-generation communication utilizing OFDM. Some examples of the various forms of information are the data communication of best-effort type, the audio communication such as VoIP and the video streaming information.

In order to realize a broader band system, a method of the next-generation communication is proposed in which without any line dedicated to the wireless control channel, a part of the channel made up of OFDM is used for the wireless control channel as well as for the normal data channel. In accordance with the number of wireless mobile stations connected, the number of wireless channels required by each mobile station and the situation of the propagation path, the resource allotment to the wireless control channel is adaptively controlled. In this way, the overhead due to the wireless control channel that has thus far been caused by the margin design can be reduced.

IEEE C802.20-06/04 describes a method in which the wireless control channel such as the down link control channel F-SSCH is transmitted using several channels configured of OFDM. In this wireless control channel, the allotted amount and arrangement are declared at the head of the superframe.

The mobile station connected to the base station using this method in which the allotted amount and arrangement of the wireless control channel are declared at the head of the superframe receives the wireless control channel in the following steps:

Step 101: The information on the allotment of the control channel described in the preamble at the head of the superframe is acquired. The superframe is a unit configured of several PHY frames and a preamble is transmitted at the head thereof.

Step 102: The corresponding PHY frame is retrieved from the received signal and the wireless control channel is demodulated according to a predetermined demodulation method.

3GPP2 C30-20060626-054R2 describes a method similar to IEEE C802.20-06/04, in which the power is controlled for the down link wireless control channel and the resources of the transmission power as well as the product of time and frequency are optimized thereby to reduce the interference with other cells.

The PHY frame described above is the unit of minimum division in the direction of time in wireless area configured of a plurality of OFDM symbols. The process of channel coding is executed in this PHY frame unit.

FIG. 1 is a diagram showing the frame structure of 3GPP2 C30-20060626-054R2.

In FIG. 1 showing the superframe structure for TDD, a preamble is arranged at the head of the superframe.

FIG. 2 shows the preamble structure. The preamble has the structure shown in FIG. 2, and includes a pilot field (TDM1, TDM2, TDM3) for frame synchronization by the terminal and the broadcast information (pBCH0, pBCH1). The "PHY frame" is differently called according to a different standardization and may be referred to as a subframe.

SUMMARY OF THE INVENTION

1. Problems at the Time of Smart Antenna Support

As a technique for utilizing the limited frequency band efficiently, the spatial signal processing is closely watched. The smart antenna is a collective name of the techniques for realizing the spatial modulation including the beam forming and MIMO (multi-input multi-output) in the receiving or transmitting operation. The array antenna includes a plurality of antenna elements arranged in spaced relation with each other and used for realizing the smart antenna. First, the problems of the beam forming are described in order.

The beam forming is a function generally mounted on the base station, in which a signal subjected to a complex weight is sent out from a plurality of antennas in such a manner that the radio wave is propagated only in a specified direction by spatial synthesis thereby to control the directivity. The reason why this function is mounted on the base station is that the power consumption rule of the base station is loose and the antenna intervals can be determined rather freely. The problems are explained below with the beam forming at the base station as an example.

Problem 1:

FIG. 3 is a circuit concept diagram for explaining the implementation of the beam forming.

The beam forming is a technique in which, as shown in FIG. 3, the array weight is generated for the signals received by a plurality of antennas 301 using the propagation path estimation result measured for each antenna (302), and this array weight is imposed on the received signal for weighted summing (303) thereby to increase the array gain of the signal in a specified direction. As an alternative, the transmission signal is copied into a plurality of signals (304), and using the up link information, the array weight of the down link is generated (305). Then, the copy signals are weighted (307) and transmitted from each antenna thereby to increase the array gain of the signal only in a specified direction.

In the up link (from mobile station to base station), the propagation path for the signal received by each antenna can be estimated based on the signal received by each antenna of the base station. The array weight can be easily estimated using the estimated propagation path result. Also, according to the TDD (time division duplex) scheme, the up link (from mobile station to base station) and the down link (from base station to mobile station) use exactly the same propagation path by time division. Thus, the array weight of the down link can be estimated by use of the propagation path estimated for the up link. Especially, in the communication of circuit switching type with the line allotted continuously, the propagation path from the up link to the down link which is capable of periodical reception can be estimated.

The present trend, however, is toward the packet-type communication typically used in the internet rather than the aforementioned service of circuit switching type. In the packet-type communication, the information paired with the down link is not necessarily existent in the up link and the array antenna of the down link cannot be controlled.

Also, OFDMA is a technique having the feature that, due to the spread of frequency, the resources can be freely allotted to increase the frequency utilization rate. In the case where the frequencies of the up link and down link are linked to each other as a pair to control the array antenna, therefore, the freedom of frequency resource allotment is restricted, and the problem is posed that the frequency utilization rate is reduced as compared with the case where the channel is allotted freely.

FIG. 4 shows the configuration of the up link control channel of 3GPP2 C30-20060626-054R2.

In this example, the up link control channel hops on the frequency axis. By use of this hopping control channel, the propagation path of each frequency can be known. Also in this method, however, the period of propagation path estimation is lengthened depending on the hopping period, and the assumption is disrupted that the up link and down link propagation path characteristics in TDD are substantially the same.

The propagation path has a frequency characteristic. Especially, in a system having an antenna configuration with the antennas distant from each other, the frequency characteristic tends to change greatly, and in the conventional method depending on the hopping period, the propagation path is difficult to estimate.

Further, 3GPP2 C30-20060626-054R2 discloses the control channel transmission producing the frequency diversity effect by the CDMA transmission in broad band on the up link. The signal transmitted by CDMA is required to design not to interfere with other OFDM signals using a filter.

FIG. 5 shows the signal as the result of the filter limitation.

As shown in FIG. 5, the filter limitation results in the gain being reduced for the filter-cut band (501) as compared with the OFDM signal, and therefore, sufficient propagation path information cannot be obtained. With the OFDM signal (502), assume the propagation path information of each channel as:

$$\tilde{h}_n \qquad \text{[Expression 1]}$$

Then, the average propagation path estimation result for the 300 kHz band can be estimated by the equation:

$$<\tilde{h}> = \sum_{n}^{N} \tilde{h}_n / N \qquad \text{[Expression 2]}$$

The CDMA signal (503), on the other hand, has a part (501) thereof short of the gain, and the average propagation path estimation result is given by:

$$<\tilde{h}'> = \sum_{n}^{N} W_n \tilde{h}'_n / W \qquad \text{[Expression 3]}$$

Thus, a weighted propagation path estimation result is involved, and the estimation sufficiently reflecting the information on the part (501) short of the gain is impossible. Also, in the case where the block hopping is involved, the array weight reflecting the propagation path estimation result for each 300 kHz can be desirably obtained. With CDMA, however, the average propagation path estimation result for the entire subband of 1.275 MHz is obtained, thereby posing the problem that the propagation path cannot be estimated for each 300 kHz making up the subchannel.

2. Problem of Mobile Station Battery

With the recent increase in data communication speed in the wireless section, the operating frequency bandwidth tends to increase. The resulting problems of the mobile station or especially the problems centered on power consumption are discussed in order.

Problem 2-1:

With the single carrier of the conventional system, take PHS (Personal Handy phone System) as an example. The bandwidth is as narrow as 300 kHz, and since the modulation scheme π/4 QPSK has so small a difference (PAPR) between the instantaneous power and the average power that the backoff is suppressed, and a small amplifier can be employed. As a result, the power consumption of the mobile station (MS) for up link data transmission can be reduced. A scheme with a broad frequency band like OFDMA in which PAPR approaches the Gaussian distribution, however, requires a large backoff of the amplifier. As compared with the prior art, therefore, the power consumption for transmission is increased, thereby posing the problem of a shorter battery life.

The effect of the broadband system is explained with reference to FIG. 6.

In FIG. 6, the abscissa represents the frequency and the ordinate the power density per band. The power that can be transmitted from a terminal is limited from the viewpoint of the power consumption. In FIG. 6, the transmission power is expressed as the product of the frequency and the power density, i.e. the area defined by 601 and 602. In the narrow band communication, as designated by 601, the transmission band is so narrow that the power can be transmitted with a higher power density per frequency. With the broad band, however, the power density per frequency is required to be reduced to secure a constant transmission power (the area defined by 602). The endurance against the thermal noise is reduced, the lower the power density. In order to realize the broad band communication, therefore, the transmission power defined by the area described above is required to be increased. This is the problem to be solved.

Problem 2-2:

In order to reduce the power consumption of the mobile station, a longer time is set for the incoming data monitor interval in standby mode. In the case of PHS, for example, the interval is 1.2 seconds. A long interval, however, lengthens the interval at which the call control information such as a paging is supplied to the terminal, thereby leading to the problem of a longer connection time.

3. Cell Search Problem

The mobile station is required to make an investigation (cell search) to determine what kind of the base station exists nearby and which base station has the highest radio wave receiving strength at the time of switching on power or handover. The problems of cell search are summarized below.

Problem 3-1:

Generally, the cell search of the mobile station is the operation to receive the pilot signal and the common control channel transmitted by the base station and to search for a base station having the best receiving state from the receiving level. The conceivable motive of cell search is the power-on operation, the reduction in the standby holding level at the base station or the handover during the communication. At the time of handover during the communication, the problem is posed that the base station cell search time is reduced to reduce the communication suspension time.

Problem 3-2:

PHS based on TDMA-TDD scheme requires the search time of at least 100 msec.

FIG. 7 shows the conventional control channel transmission timing diffusion.

The provision of 20 interval durations in the TDMA frame of 5 msec as shown in FIG. 7 permits the base station to transmit the control information at the transmission timing of once per 100 msec (=5×20 msec). The TDMA frame has a maximum of four slots, and therefore, 80 (=20×4) base stations can be separated. During the cell search, however, the mobile station is required to observe all the slots, and a frequent cell search poses the problem of power consumption of the mobile station.

4. Problem of Control Channel

Now, the problems relating to the control channel are described.

Problem 4-1:

In OFDM communication, how to set the window for the receiver to execute the FFT process is important. In OFDM, in order to reduce the interference between symbols, a guard interval (GI) (or a cyclic prefix (CP)) is inserted to prevent the interference between the symbols at the time of executing the FFT process.

FIG. 8 shows the relation between the received signal (801) and the FFT windows (802 to 805) of the receiver.

The GI is attached to the Nth and (N+1)th OFDM symbols. In the case where the FFT window is accommodated in the OFDM symbol including the GI, the information of the symbol in the window is not changed. A given subcarrier signal is a specified frequency component integrated with the phase and amplitude information. Therefore, the orthogonality of FFT has no effect on other subcarriers and no interference occurs. In FIG. 8, therefore, no signal interference with other subcarriers occurs in CASE 1 and CASE 2. In CASE 3 or CASE 4 where the FFT window is overlapped with the (N−1)th or (N+1)th OFDM symbol, however, the amplitude or the phase of the signal of a specified subcarrier undergoes a sudden change, and the components of other subcarriers are generated, thereby causing an interference with adjacent subcarriers.

FIG. 9 shows the result of calculating the level of interference with adjacent subcarriers.

FIG. 9 shows the result of the calculating the level of interference with adjacent subcarriers using, as a parameter, how many samples have interfered with the window for 2.56 FFT points. When $\delta$ is 64/256, it indicates the interference amount in the case one fourth of the window size is overlapped with another FDCM symbol. In this way, once the FFT orthogonality is disrupted by the window setting over GI, a large interference occurs with adjacent subcarriers. This phenomenon is considered to occur in the following cases:

(1) The access channel is transmitted in the dormant state where it is difficult for the mobile station to secure a sufficient synchronization.
(2) The mobile station is in dormant state and the information on the base station is observed only intermittently.

The dormant state is briefly explained. The state of the mobile station is roughly divided into three states including an idle state, an active state and a dormant state.

FIG. 10 is a diagram showing the transition of the physical channel of the mobile station.

The idle state 1003 is the standby state where the wireless link is released. The active state is the one where the data is transmitted/received during the communication and allotted the individual control channel and the data channel (1001). The dormant state 1002 is the state where the data is not transmitted/received even during communication, and though the individual control channel is allotted, the data channel is used by other users or released (1002). In the packet communication, it is a common practice, for effective use of the resources of the communication path, to repeat the operation in which the data channel is allotted only in the active state, while in the dormant state, the data channel is opened and other users granted the communication right.

In this case, the problem is that depending on the manner in which the FFT window of the base station or the mobile station is set, a large interference occurs. With regard to (2), 3GPP2 C30-20060626-054R2 discloses a frame format in which the GI length at the head of the superframe is lengthened and only the head PHY frame is lengthened. A plurality of the base stations prevent the interference between symbols by securing the frame synchronization.

Problem 4-2:

The individual control channel constitutes an overhead, and therefore, the efficiency is required to be improved by minimizing the information amount. On the other hand, the important information such as CQI (channel quality indicator) indicating the line state and the channel allotment information are also sent, and therefore, the individual control channel is desirably transmitted in stable fashion. For this reason, the signal is desirably sent by a method capable of producing the diversity effect easily. According to 3GPP2 C30-20060626-054R2, the individual control information for a plurality of mobile stations are packed and transmitted using a plurality of tiles on down link thereby to produce the frequency diversity effect. In the case where the individual control channel is sent using the array antenna, however, the control channels for a plurality of users cannot be packed, and the problem is posed that the packed information cannot be sent by a specified beam forming.

5. Problem Related to Frame Synchronization of Mobile Station

Now, the problem related to the frame synchronization of the mobile station is described.

Problem 5:

In multiplex transmission of a common control channel in a plurality of base stations, the frame synchronization between the neighboring base stations is a prerequisite. When viewed from the mobile station (1110) as shown in FIGS. 11A and 11B, on the other hand, a propagation delay of T3-T1 (1122, 1120) occurs between, for example, the base station 1 (1101) and the base station 3 (1103). As a result, as shown in FIG. 12, the signal of one of the base stations is passed through a discontinuous point on the receiving window (1210) of the mobile station, thereby generating an interference between the symbols. Also in the macro cell arrangement liable to generate a propagation delay, for example, the improvement of the rate of success in establishing synchronization at the receiving time is a problem.

This invention has been achieved to solve the aforementioned problems, and the object of this invention is to provide a wireless communication method and a wireless communication system in which the propagation path estimation required for realizing the smart antenna is facilitated even during the block hopping thereby to relax the effect of the interference between the cells, the high-speed cell search is realized to support the realization of the high-speed handover, and further, the interference by the access channel is reduced thereby to reduce the frequency of wireless observation in dormant state and thus reduce the power consumption of the mobile station.

The aforementioned problems can be solved by the TDD wireless communication method based on OFDMA employed by at least two communication units A and B, characterized in that A sends a pilot signal over the whole subband zone configured by dividing a predetermined band and B equipped with a plurality of antennas estimates a propagation path of a subchannel constituting continuous frequency blocks making up the subband, so that B determines the array weight used for signal transmission to A using the estimation result.

Also, the aforementioned problems are solved by the aforementioned wireless communication method, characterized in that the communication unit B transmits one packet in plural divisions a plurality of times in such a manner that at the time of each transmission, the subchannel transmitted is changed and the changed pattern is varied from one base station to another.

Also, the aforementioned problems are solved by a wireless base station apparatus having a plurality of antennas employing the TDD wireless communication method based on OFDMA, characterized in that the pilot signal transmitted over the entire subband zone from a terminal device is received by a plurality of antennas, the propagation path for each subchannel constituting continuous frequency blocks making up the subband is estimated from the received pilot signal, and the array weight used for signal transmission to the terminal device is determined using the estimation result.

Also, the aforementioned problems are solved by a wireless terminal device employing the TDD wireless communication method based on OFDMA, characterized in that the pilot signal and the individual control information are scrambled in a way unique to the terminal device thereby to generate an OFCDMA signal over the whole subband zone configured by dividing a predetermined system band, and the OFCDMA signal is transmitted.

Also, the aforementioned problems are solved by a wireless base station apparatus, characterized in that at the time of signal transmission to a terminal device by dividing one packet into a plurality of parts to be a plurality of times, the subchannel to be transmitted is changed each time of transmission and the changed pattern is varied from one base station to another.

According to this invention, the propagation path estimation required for realizing the smart antenna can be carried out easily even during the execution of block hopping and the effect of interference between the cells can be relaxed. Also, a high-speed cell search can be realized and the realization of the high-speed handover can be supported. Further, the interference by the access channel is reduced and by reducing the wireless observation frequency in dormant state, the power consumption of the mobile station can be reduced.

Other objects, features and advantages of the invention will become apparent from the following description of the embodiments of the invention taken in conjunction with the accompanying drawings.

BRIEF DESCRIPTION OF THE DRAWINGS

FIG. 7 is a diagram showing the conventional control channel transmission timing distribution.

FIG. 8 is a diagram for explaining the receiving result at the receive window position of the mobile station against the frame timing of the base station.

FIG. 9 is a diagram showing the result of calculating the level of interference with adjacent subcarriers.

FIG. 10 is a diagram for explaining the transition of the physical channel.

FIGS. 22A and 22B are diagrams showing the pilot signal arrangement pattern of the common control channel according to an embodiment of the invention.

FIG. 24 is a diagram for explaining that the mobile station receives the frequency from a plurality of surrounding base stations.

FIG. 25 is a diagram for explaining that the mobile station receives the frequency from a plurality of surrounding base stations.

FIG. 26 is a diagram for explaining that the mobile station receives the frequency from a plurality of surrounding base stations.

FIG. 27 is a diagram showing the processing flow for searching the pilot arrangement of the surrounding base stations by a base station according to an embodiment of the invention.

FIG. 30 is a diagram showing the contents of the control channel transmission according to an embodiment of the invention.

DETAILED DESCRIPTION OF THE INVENTION

Several embodiments of the invention are explained below.

The cellular radio is transferring from CDMA to OFDMA. OFDM is a method in which a frequency band is divided into units called a subband utilizing the fast Fourier transform (FFT) and the information is sent individually in each subband.

Figure 13:
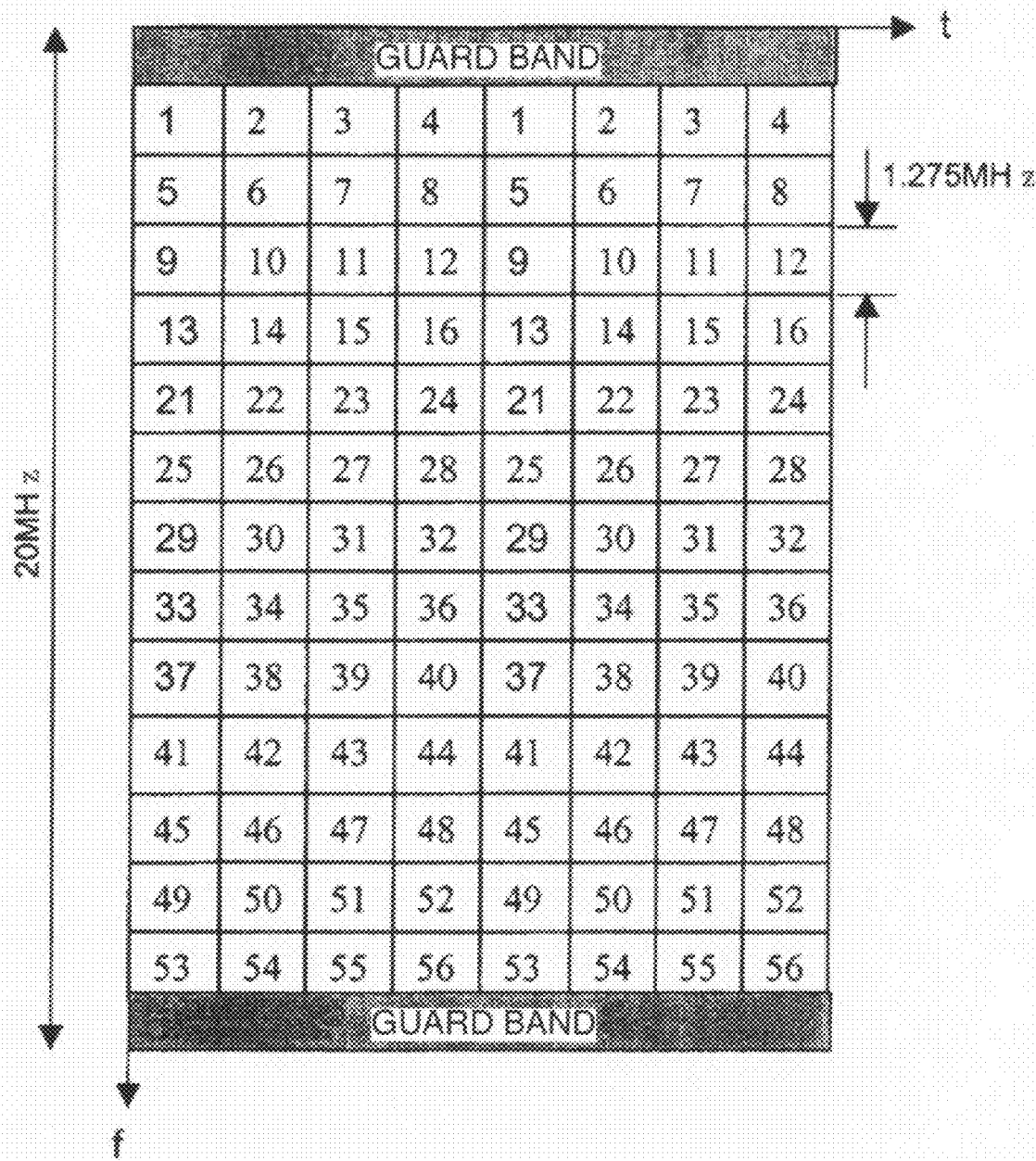
FIG. 13 is a diagram showing an example of OFDMA signal division taken two-dimensionally on frequency axis and time axis.

FIG. 13 shows an example of the signal division according to OFDMA.

FIG. 13 shows an example of OFDMA signal division taken two-dimensionally on frequency axis and time axis, and the ordinate represents the frequency. The example shown in FIG. 13 has a system band of 20 MHz. Incidentally, the subband is further divided into several units called subcarriers. The abscissa represents the time, and divided into minimum units called subframes. In FIG. 13 divided in this way, each rectangle with a numeral attached thereto is called a tile.

Embodiment 1

[System Description]

Figure 14:
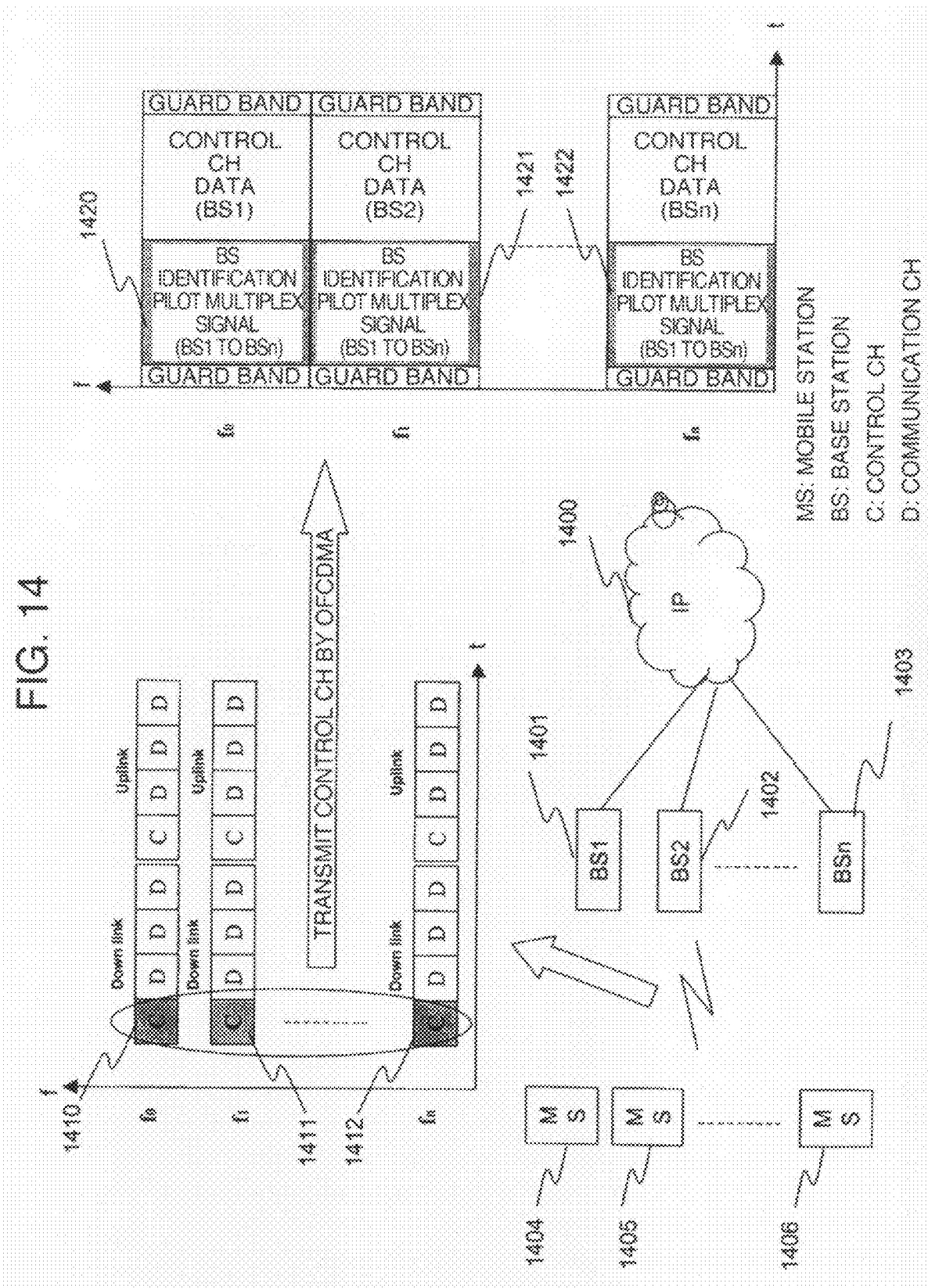
FIG. 14 is a diagram showing a general configuration for the common control channel transmission according to an embodiment of the invention.

An example of the system configuration is shown in FIG. 14.

The system is configured of base stations (BS) 1401 to 1403 connected to an IP network (1400) and mobile stations (1404 to 1406). Signals are transmitted and received between the base stations and the mobile stations by the TDMA-TDD communication method. ODFM is used as a modulation method.

The signals thus transmitted and received are classified into a control channel (CCH) and a data channel (DCH). The down link control channel is a channel through which the broadcast information and the incoming data information indicating the state of the base stations are transmitted to the mobile stations. The up link control channel is used to request a call activation. The data channel is used to transmit and receive the user data.

[Base Frame Structure]

Figure 15:
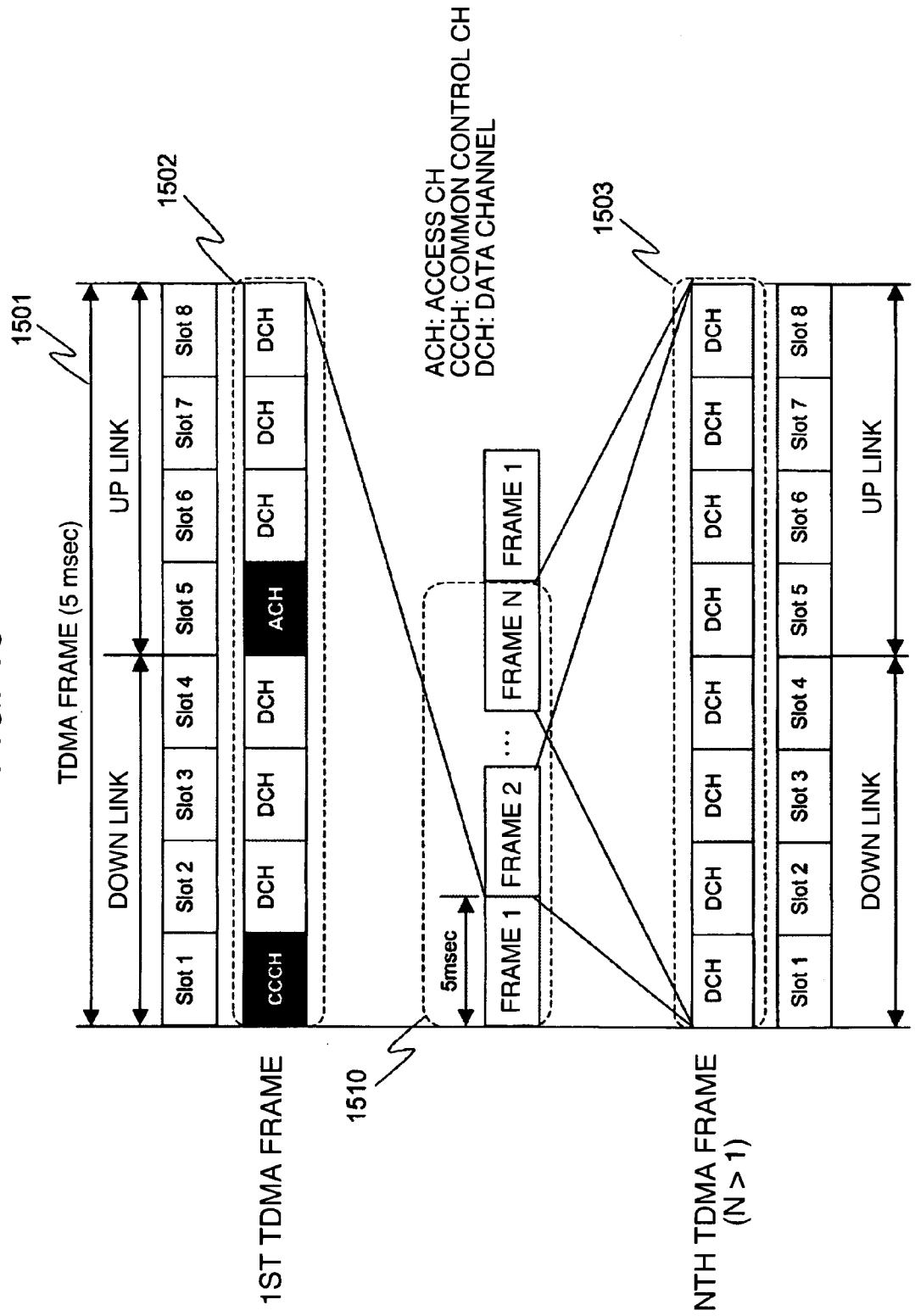
FIG. 15 is a diagram for explaining the control channel transmission frame according to an embodiment of the invention.

FIG. 15 shows a base frame structure according to a first embodiment of the invention.

A base frame 1510 is configured of a predetermined number of TDMA frames 1501. The TDMA frames 1501 are of two types of patterns. The first pattern is designated by numeral 1502 in FIG. 15 and employed in the TDMA frame (FRAME 1 in FIG. 15) constituting the head of the base frame. The other pattern is designated by numeral 1503 and employed in the TDMA frame other than the head of the base frame. Slots 1 to 4 correspond to the down link channel transmission timing, and slots 5 to 8 the up link channel transmission timing. In the pattern 1502 at the head of the base frame, the first slot is allotted to the down link common control channel, and the fifth slot to the up link control channel. This base frame structure is shared by a plurality of base stations, and the base frames are synchronized. Specifically, in different base stations, the base frame is started at the same time point, so that a plurality of the base stations share the same timing of the down link common control channel (first slot of the first pattern 1502).

The down link common control channel contains a preamble pattern section indicating the frame head and a common control channel section. The common control channel section announces the broadcast information announcing the information of the base stations, the paging information for accessing the mobile stations and the grant information responding to the access channel.

In the up link control channel, the access channel (ACH) whereby the mobile station requests the access to the base station is transmitted. The mobile station, at the time of sending out the access channel, is not yet in the state sufficiently capable of controlling the timing against the base station. In the configuration in which the access channel can be transmitted at the same time as other channels, therefore, the interference with adjacent subcarriers described in Problem 4-1 occurs. In order to prevent this, according to the first embodiment of the invention, a channel (timing) dedicated to the access channel transmission is formed. This is the up link control channel. In FIG. 15, the fifth slot of the first pattern (15402) constitutes the up link control channel. Even in the case where the mobile station not sufficiently synchronized with the base station transmits the access channel, therefore, the other channels are not affected. Thus, Problem 4-1 is solved.

A transmission of an access channel is not limited at the time of a call. The access channel is transmitted similarly in the case where a new base station is connected, for example, at the time of the handover process. The mobile station can establish a link by transmitting the access channel to the base station as a new destination of connection. Also in this case, the mobile station, though adjusted in timing with the original base station connected therewith, is not adjusted in timing with the adjacent base station having a different propagation distance from the original base station. In the case where the information of normal GI length is transmitted to the newly-connected base station under this condition, the newly-connected base station, not informed of the receive timing, is not adjusted in timing. It is therefore necessary to give a sufficient GI length to absorb the distribution of the round-trip delay. Once a sufficient GI length is secured, the base station can set a FFT window and execute the FFT process at appropriate timing within the range of the GI length and thus receive the up link access channel without causing any interference between the symbols. It is already explained above that the interference between the symbols occurs in the case where an access channel of a long GI length is received at the same time as another channel of a short GI length. According to this invention, however, the access channel never coexists with another OFDM symbol with shorter GI length at the same time, and therefore, Problem 4-1 is not posed that a large interference occurs depending on the manner in which the FFT window is set in the base station or the mobile station. Thus, Problem 4-1 is solved. In the base station, the access channel detection and the timing measurement are carried out simultaneously.

Figure 16:
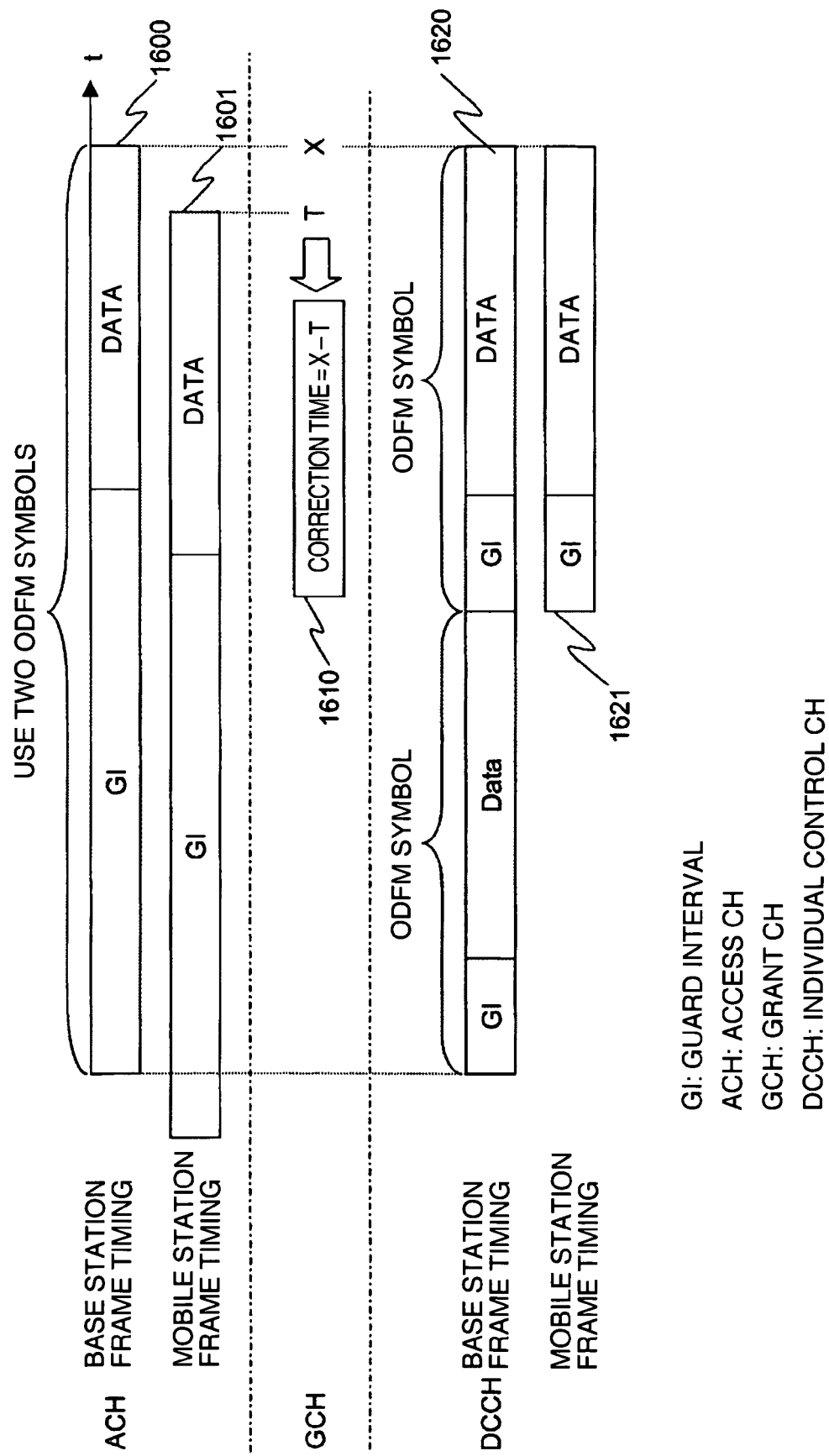
FIG. 16 is a diagram showing the synchronization between the mobile station and the base station.

FIG. 16 is a diagram showing the synchronized state between the mobile station and the base station.

Figure 17:
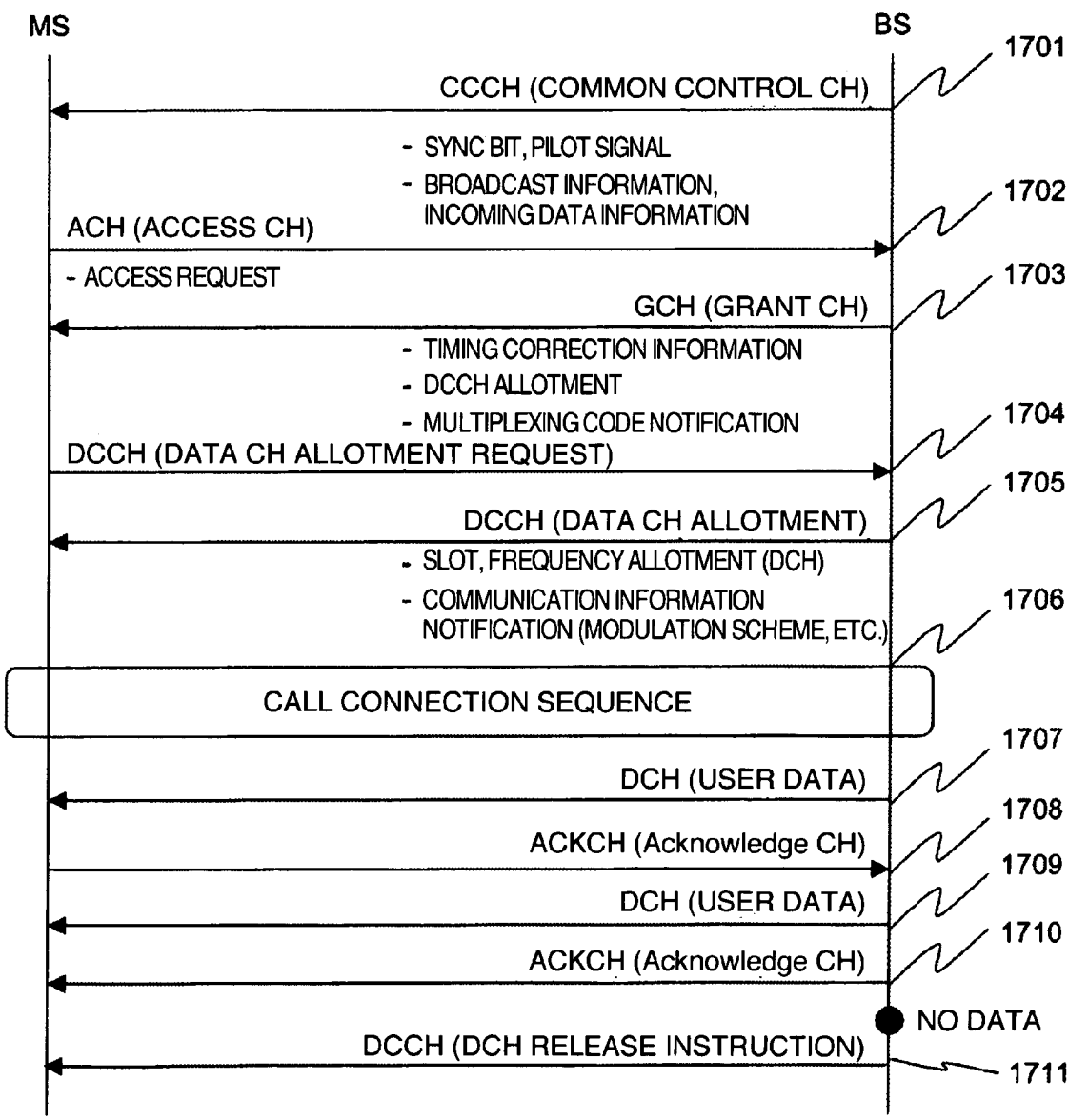
FIG. 17 is a diagram showing the call connection sequence according to an embodiment of the invention.

As shown in FIG. 16, in the case where the base station detects the access channel (1610) transmitted by the mobile station, the receive timing T is determined from the phase of the pseudo-random signal. Based on the receive timing thus determined, the timing adjust amount for applying the received signal to the FFT window is calculated. In the case where the receive timing is T and the reference value of the FFT window is X (1600), for example, the received signal (1611) from the mobile station can be accommodated in the FFT window (1610) by delaying the transmission timing of the mobile station by (X−T). This timing adjust amount is transmitted as a grant channel (GCH) signal transmitted from the base station as a response to the access channel, and further, the information on the delay time adjustment is sent together with the mobile station ID, the session number and the channel allotment information. The mobile station that has received the grant information transmits the individual control channel (DCCH) using the designated channel. In the process, the individual control channel is transmitted at the timing conforming with the timing correction value designated by the grant signal. This operation is applied to the process of 1702 to 1704 of the call connection sequence shown in FIG. 17.

The access channel is not required to follow the OFDM format. As another embodiment, the CDMA signal, for example, may be used in similar fashion. The mobile station, based on a predetermined rule, generates a pseudo-random signal and transmits it as a CDMA signal. In the base station, a correlator is configured with the pseudo-random signal based on the aforementioned predetermined rule at the timing of the up link control channel (the fifth slot of the head TDMA frame), and the access channel is detected while at the same time measuring the timing. Once the access channel is detected, the receive timing is determined from the phase of the pseudo-random signal. Based on the receive timing thus determined, the timing adjust amount for applying the received signal to the FFT window is calculated. In the case where the receive timing is T and the reference value of the FFT window is X, for example, the received signal from the mobile station can be accommodated in the FFT window by delaying the transmission timing by (X−T). The grant signal sent from the base station as a response of the access channel contains the information on the delay time adjustment together with the mobile station ID, the session number and the channel allotment information. The mobile station that has received the grant information transmits the individual control channel using the designated channel. In the process, the individual control channel is transmitted at a timing conforming with the designated timing correction value. As a result, no interference by the access channel transmission with other channels basically occurs. Thus, Problem 4-1 that a large interference occurs depending on the manner in which the FF window is set in the base station or the mobile station is solved.

(Structure of Base Frame Head Slot)

Figure 18:
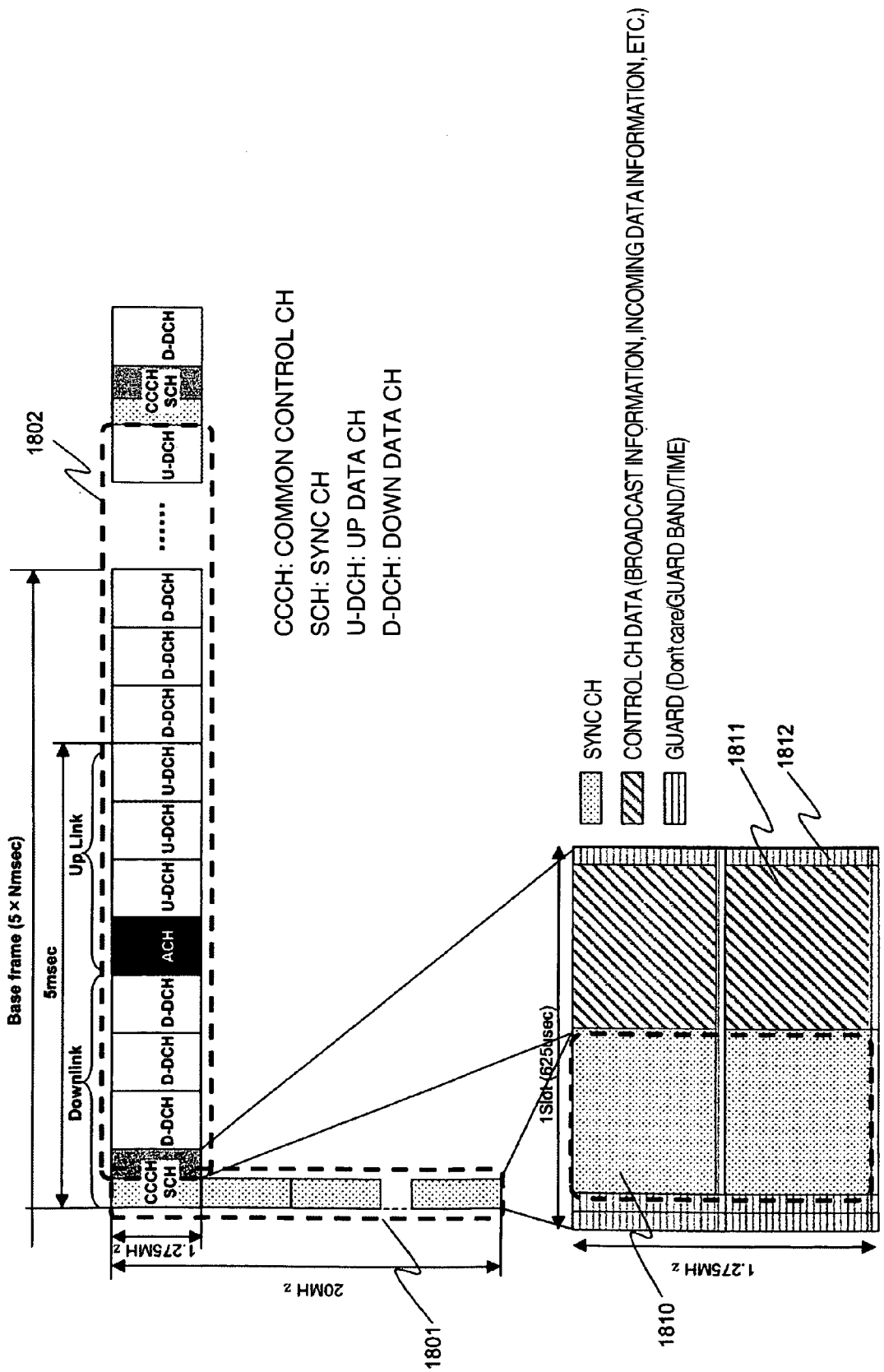
FIG. 18 is a diagram for explaining the down link common control channel structure according to an embodiment of the invention.

With reference to FIG. 18, the common control channel structure is explained.

First, the prior art is explained.

Figure 1:
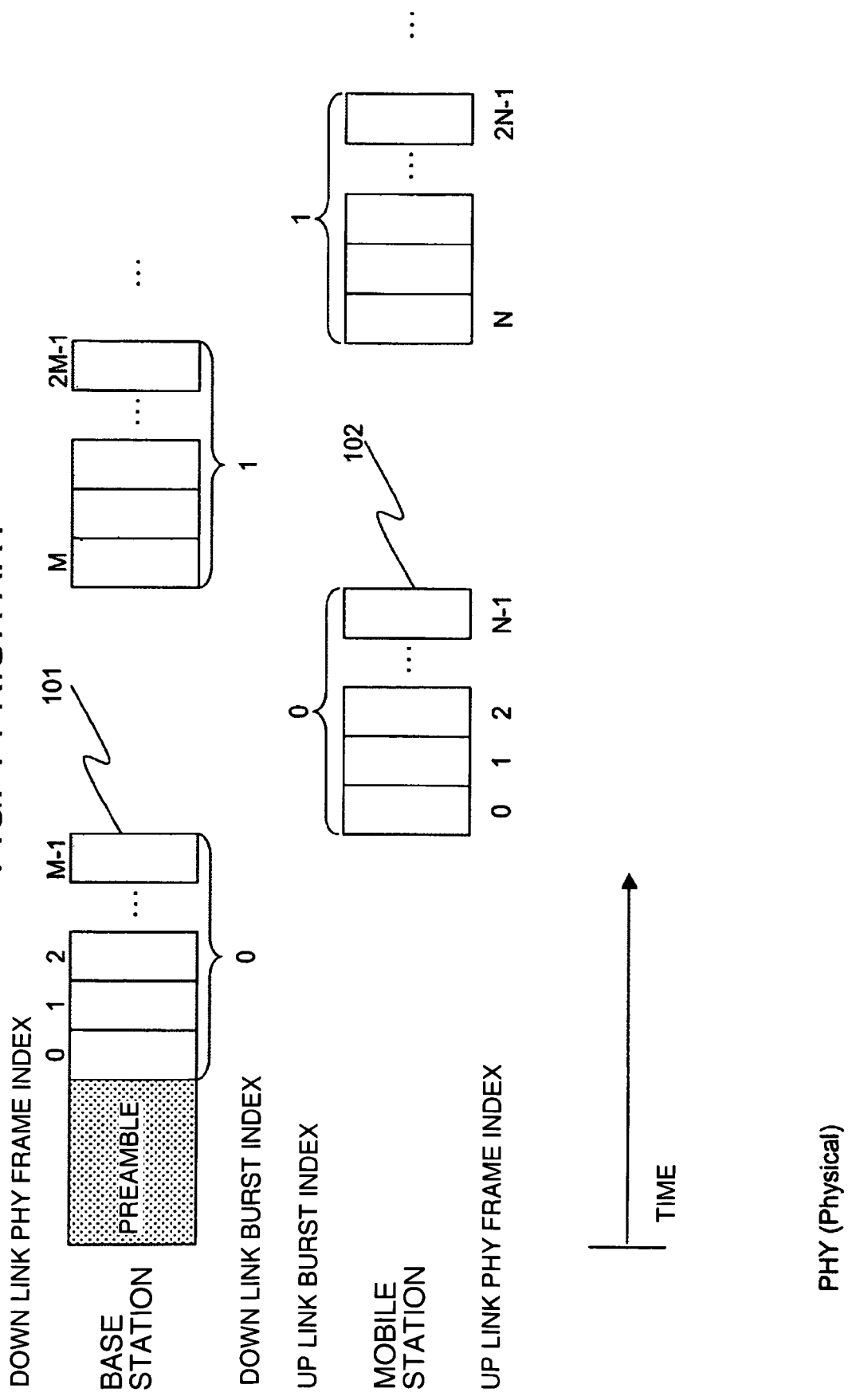
FIG. 1 is a diagram showing the configuration of the conventional PHY frame.

FIG. 1 shows the structure of the superframe according to 3GPP2 C30-20060626-054R2. The common control channel is transmitted in the preamble at the head of the superframe.

Figure 2:
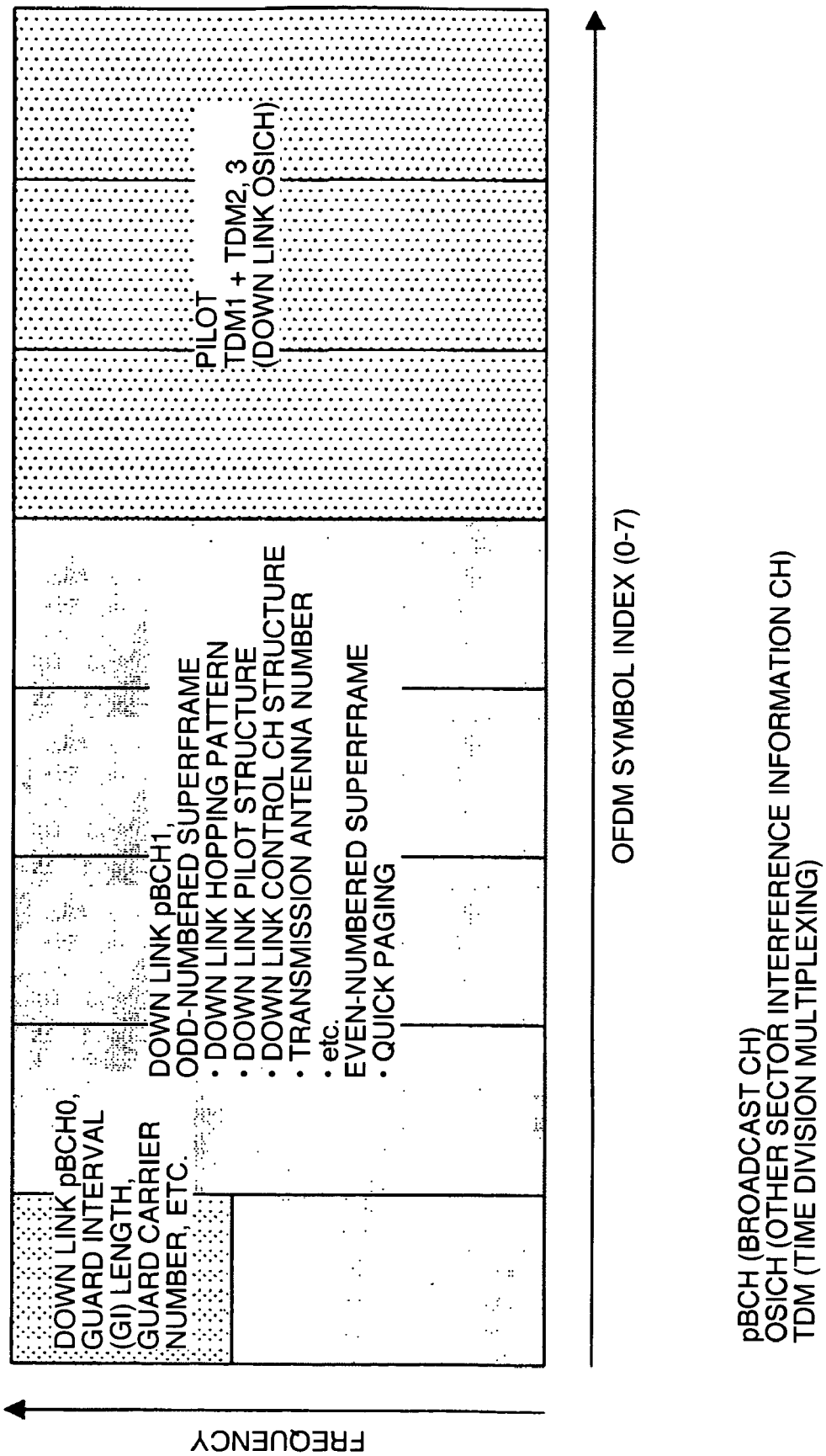
FIG. 2 is a diagram showing the configuration of the conventional common control channel.

FIG. 2 shows a frame format of the preamble at the head of the superframe. The preamble is configured of a pilot (TDM1, TDM2, TDM3) for identifying the base station by frame synchronization, F-pBCH0 for supplying the information on the OFDM basic format of the system and F-pBCH1 for supplying the paging and broadcast information. The channel following the preamble is the PHY frame for supplying the normal data channel. FIG. 1 shows the TDD structure, and the same frequency is used by the base station (BS) and the terminal (MS) by time division.

An embodiment of this invention is explained with reference to FIG. 18. In the case of FIG. 18, as in the prior art, the common control channel is transmitted in the head slot of the down link. The upper part of FIG. 18 shows a signal transmitted by one base station. On the page, the ordinate represents the frequency, and the abscissa the time. The head slot is divided into a sync channel (SCH) (1810) for recognizing the base station and securing the frame synchronization and a common control channel (1802). The remaining part (1812) indicates a guard interval containing no signal. The transmission band is in units of subband having 1.275 Hz, and SCH is transmitted over the whole zone of the system band configured of a plurality of bundles of subbands (1801). The common control channel, on the other hand, is transmitted only to a predetermined or autonomously determined subband (1802). The subband to which the common control channel is transmitted coincides with the subband to which the data channel is transmitted. The feature of this invention lies in that the preamble section included in the component elements of the head slot is transmitted over the entire band and the remaining control channel section is transmitted only in a specified frequency.

Figure 19:
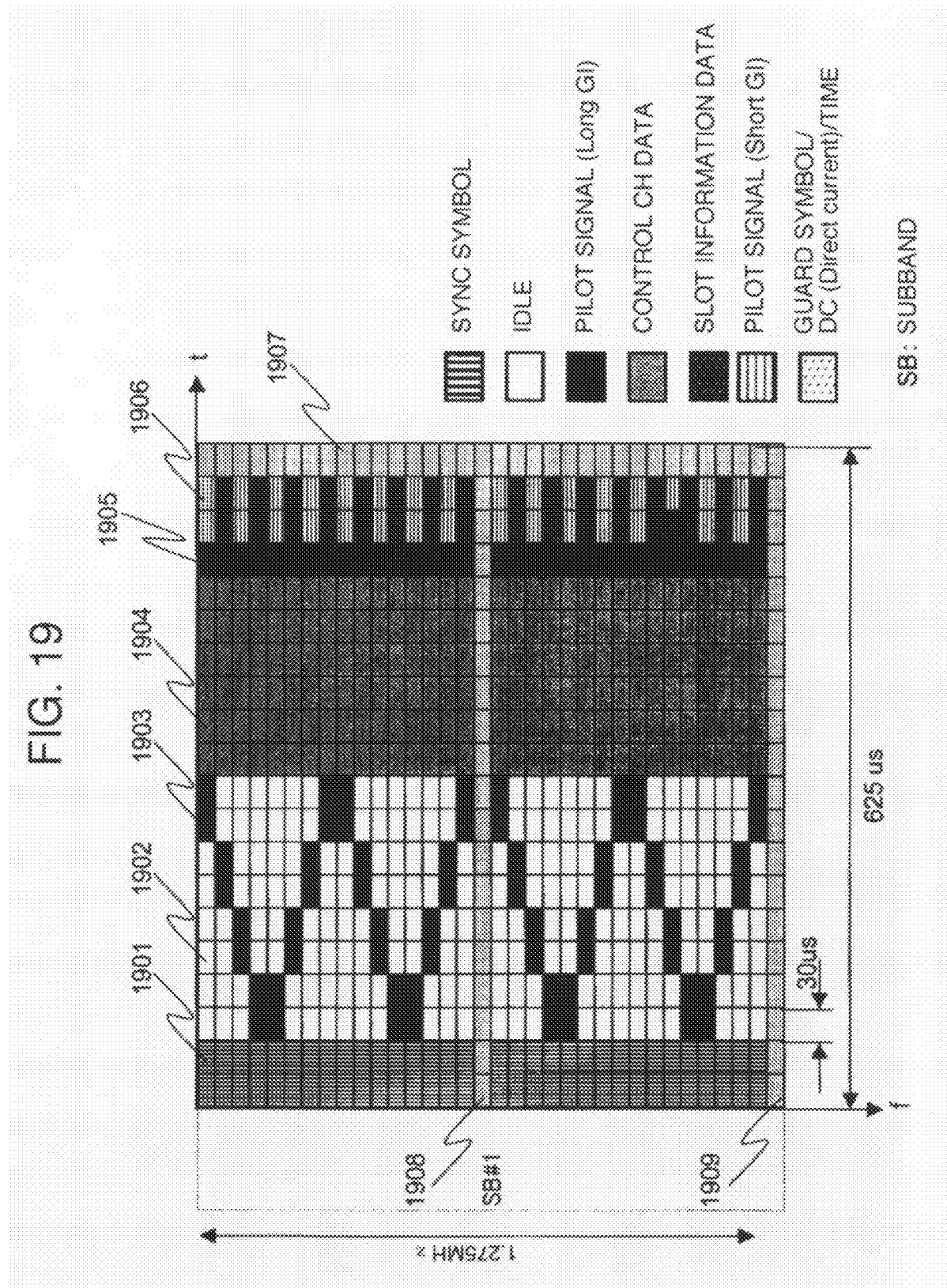
FIG. 19 is a diagram showing the symbols of the common control channel and the data mapping according to an embodiment of the invention.

FIG. 19 shows an example of the detailed symbol arrangement in the head slot structure according to this invention.

According to this embodiment, the base station has the sync channel portion configured of FDM & TDM & CDM. Specifically, the frequency, the time and the code are used for division multiplexing. The left side of the page is advanced in time. FIG. 19 shows the structure of one subband by one slot. The bandwidth of the subband is 1.275 MHz (=37.5 kHz×34 subcarriers). One slot is 0.625 msec. The subband includes a DC carrier (2408) and a guard subcarrier (2409). The symbol length of on OFDM is 30 usec, the GI length being ⅛.

As shown in FIG. 19, the sync channel is divided into 20 FDM symbols in the front stage and 80 FDM symbols in the last stage. The two symbols (1901) in the front stage, which are reference signals for frame synchronization, are inserted as a non-modulated signal. Using this signal, the terminal carries out the frame synchronization and the frequency correction. This signal for frame synchronization is received by being spatially synthesized with the non-modulated signals output from all the surrounding base stations. Using this received signal, the terminal extracts the timing. The following 80 FDM symbols are configured of FDM & TDM. Thus, an idle symbol 1902 with nothing transmitted from the base station exists. The presence or absence of the symbols is related to the frequency and constitutes the feature of the invention. The PN code series or the phase of the PN code series is varied from one base station to another and multiplexed by CDM.

Figure 20:
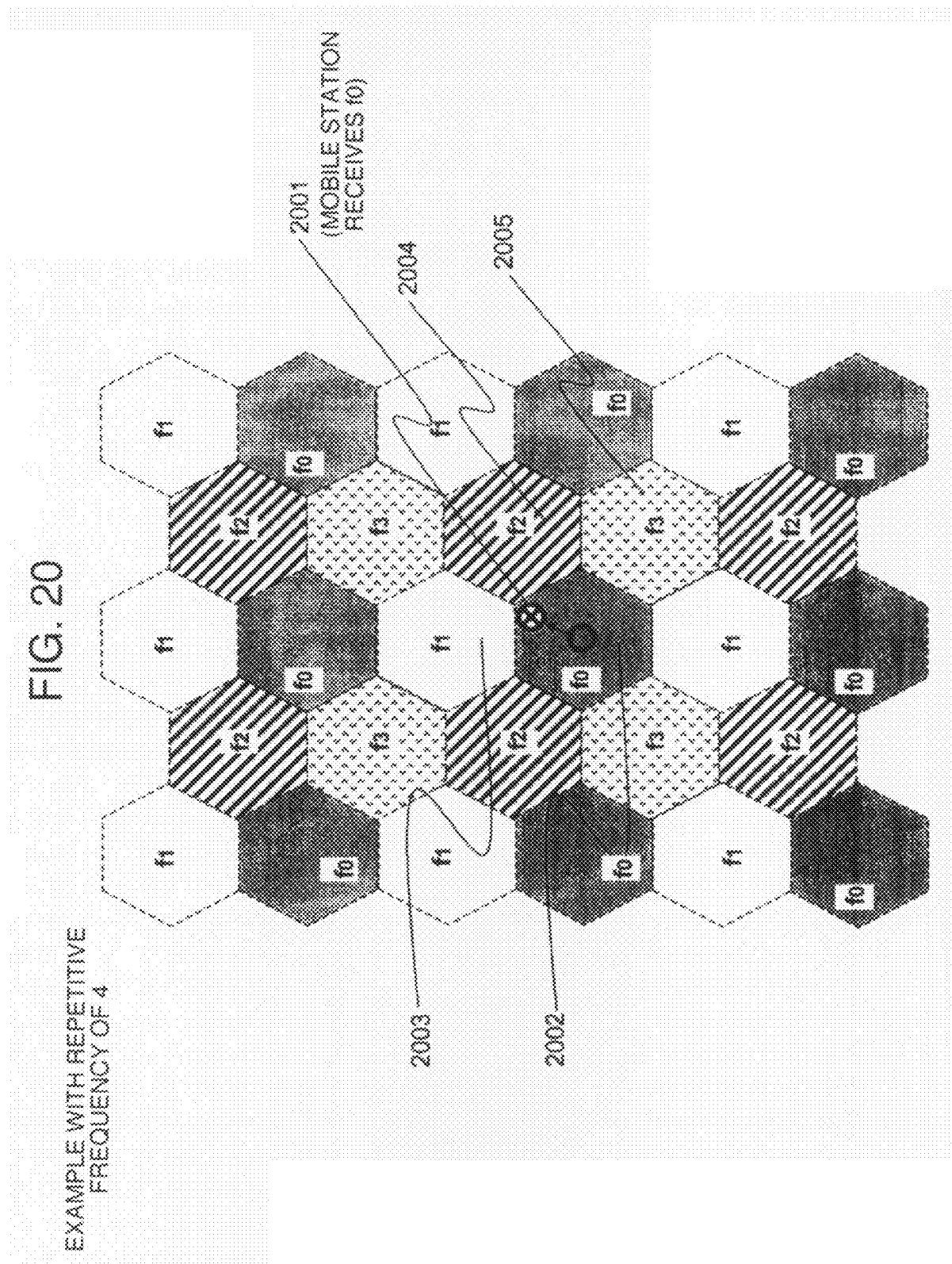
FIG. 20 is a diagram showing the arrangement and the transmission frequency of the base station.

FIG. 20 shows the arrangement and the transmission frequency of the base station.

An ideal frequency arrangement, as shown in FIG. 20, provides different frequencies for adjacent base stations (f0, f1, f2, f3). The base stations using the same frequency are illustrated by the same hatching. According to this embodiment, the reuse rate is 4 so that the distance between the nearest base stations of the same frequency is twice as long as the distance between the base stations.

Figure 21:
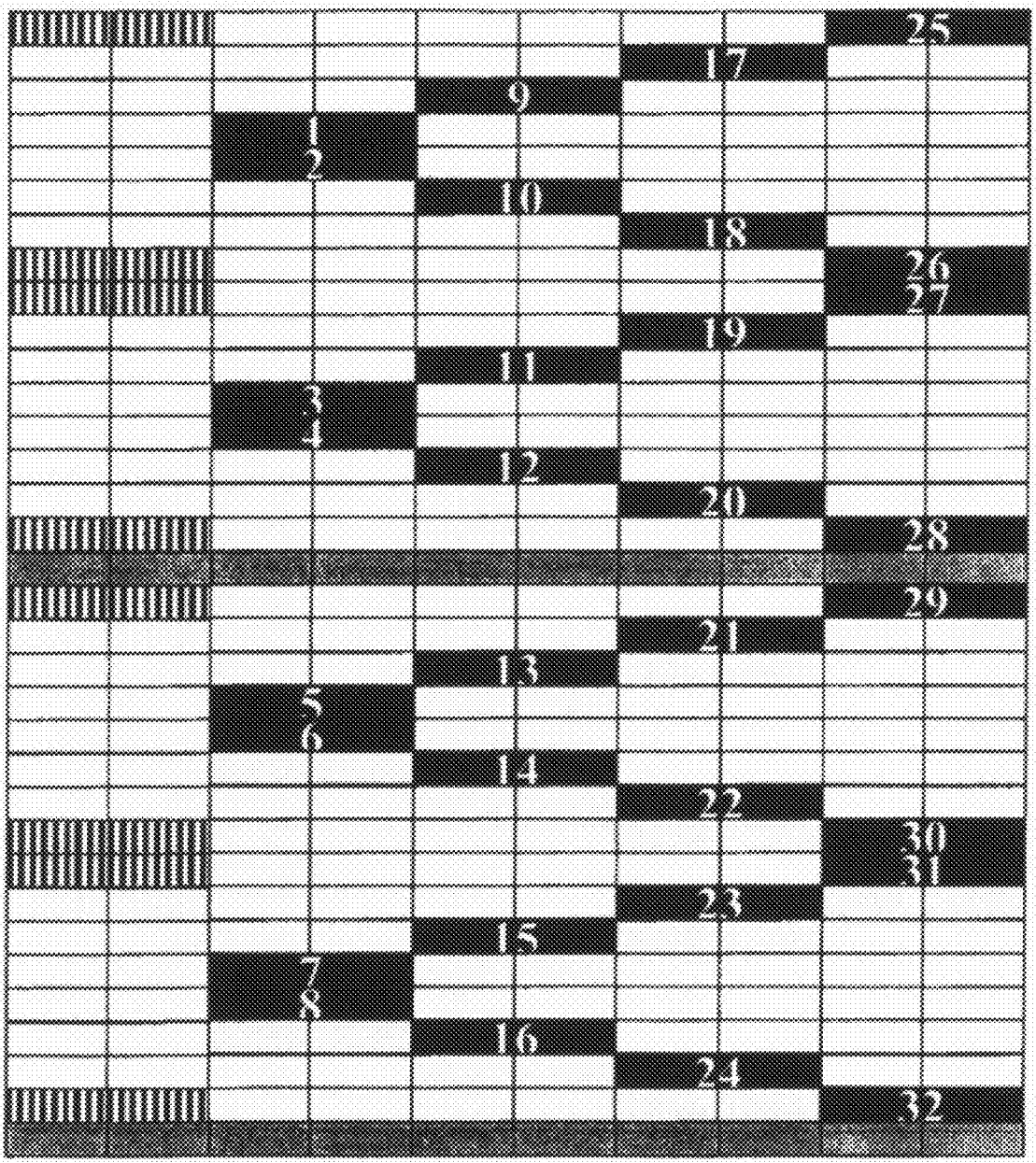
FIG. 21 is a diagram showing an example of OFDM symbol arrangement.

FIG. 21 shows an example of the arrangement of the OFDM symbol.

The code series described above is formed of two PN code series in 16 stages, for example, and the QPSK symbol is produced with the result of the first series as I axis and the result of the second series as Q axis, while the initial phase is determined as a number related to, for example, the base station ID. Then, the symbols are arranged in the order indicated by numerals in FIG. 21 on the frequency axis, thereby producing a series with low correlation to each other. By calculating the correlation of the received signal with a signal of a known correlation in the PN code series, the signals arriving from a plurality of base stations can be discriminated.

According to this embodiment, the sync channel is configured of FDM & TDM, and the patterns having and not having symbols are linked to the frequency of the data channel transmitted by each base station. This is the point of this invention.

Figure 22A:
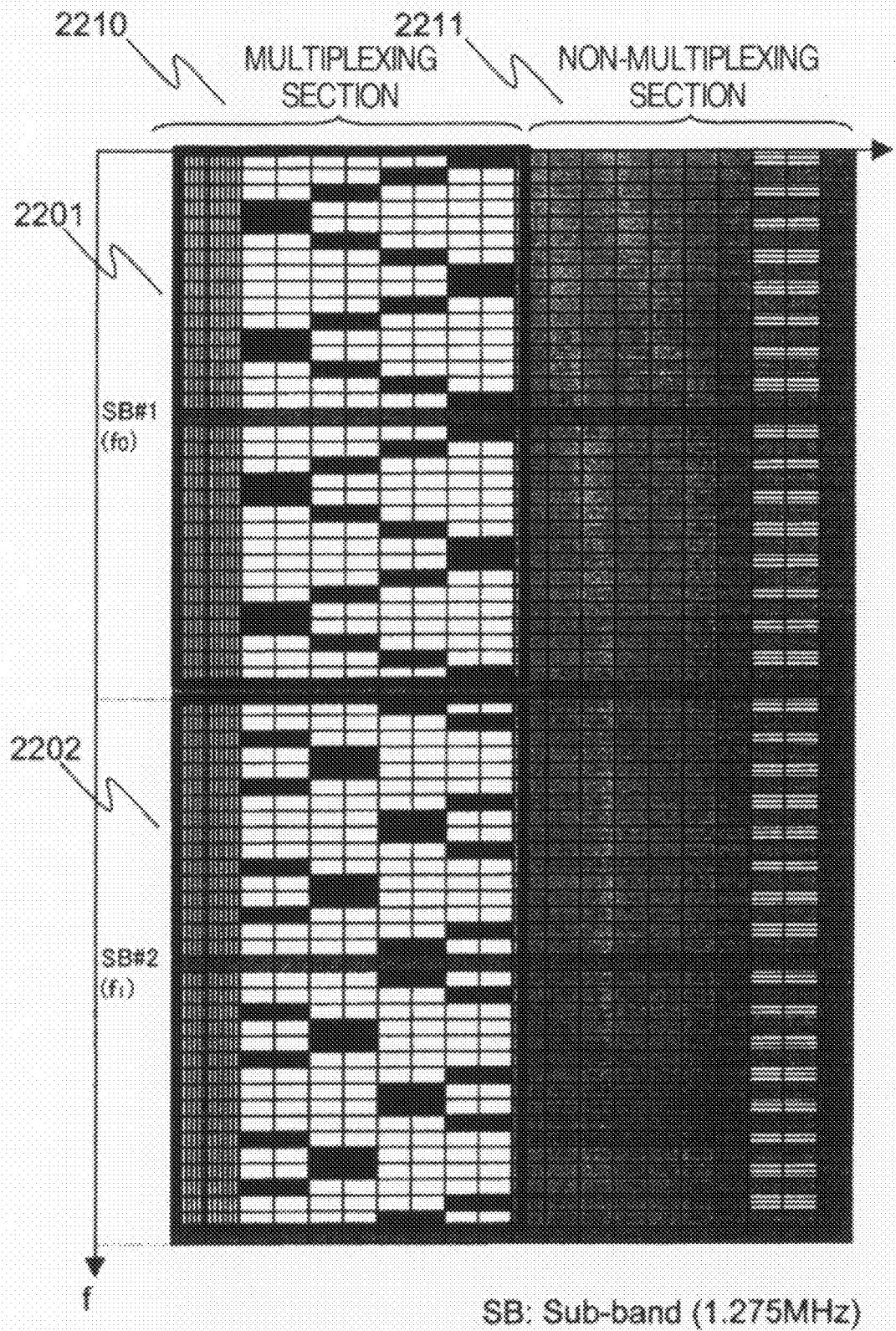

FIGS. 22A and 22B show the layout patterns of the pilot signal of the common control channel according to an embodiment of the invention.

As designated by numerals 2201, 2202, 2203 and 2204 in FIGS. 22A and 22B, there are several patterns having or not having symbols which are orthogonal to each other. Specifically, the patterns 2201 and 2202 having symbols totally fail to coincide with each other. In the case where there are base stations A and B, for example, A transmits the data channel at the frequency f0, and B at the frequency f1. The frequency f0 is linked with the pattern 2201, while the frequency f1 is linked with the pattern 2202. In the process, A transmits the sync channel with the pattern 2201 for all the frequencies (f0, f1, f2, f3), while B transmits the sync channel with the pattern 2202 for all the frequencies (f0, f1, f2, f3).

Figure 23:
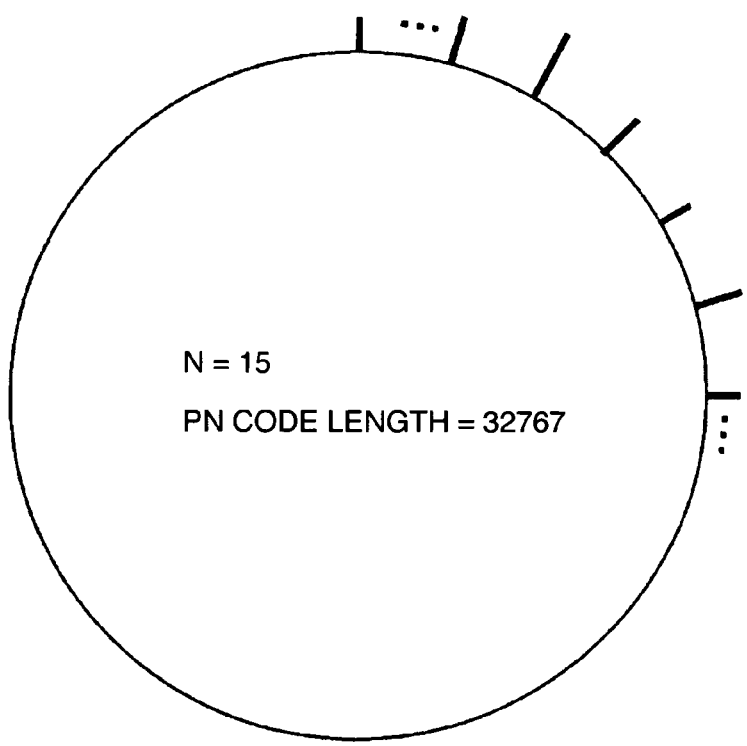
FIG. 23 is a diagram for explaining a method of separation for the common control channel of the base station according to an embodiment of the invention.

With reference to FIG. 23, a method of separating the common control channel of the base station is explained.

In FIG. 23, the PN code, which is used in the foregoing description and assumed to have N of 15 as shown, for example, has the code length of 32767. The PN code has 32767 phases, and in the case where the rule is laid down that 31 continuous phases are not allotted, 1024 patterns can be selected for allotment of the code length in each base station. As a result, the mobile station can separate 1024 base stations, and therefore, the common control channel of each base station can be considered unique in the area where the mobile station can acquire the common control channel.

FIGS. 24, 25 and 26 are diagrams for explaining the manner in which each mobile station receives the frequency from a plurality of surrounding base stations.

In FIG. 24, the mobile station 2400 can observe the base stations 2410 to 2418 at the frequency f0.

Also, in FIG. 25, the mobile station 2500 can observe the base stations 2510 to 2515 at the frequency f1.

Also, in FIG. 26, the mobile station 2600 can observe the base stations 2610 to 2615 at the frequency f2.

As described above, even in the case where the reuse rate is larger than unity, the sync channel transmitted for each frequency (only one frequency is observed, and each frequency is identified by masking with 2201 to 2204 in the transmission pattern diagrams of FIGS. 22A and 22B corresponding to the frequency) can separated and received. Even in the case where the multiplex sync channel is received from a plurality of surrounding base stations (including the frequencies f0, f1, f2), therefore, the mobile station can retrieve the information on a specific base station.

The sync channel described above is transmitted over the entire band. This is liable to pose Problem 2-1 of an increased power consumption and Problem 2-2 of an increased connection time. The symbols being transmitted are the information including idle symbols. Therefore, although a broad band is involved, a large transmission power can be secured for each symbol, so that Problems 2-1 and 2-2 can be solved.

The foregoing explanation indicates that the two symbols in the first stage (1901 in FIG. 19) are reference signals for frame synchronization and transmitted over the whole band of the system. Nevertheless, the feature of the invention is changed also in the other embodiments. This invention is also applicable, for example, to a method in which a pattern of a specified QPSK or a specified modulation scheme is inserted but not the non-modulated signal, and the base station transmits the data channel only to the transmission subband. Originally, these two symbols are used for base frame synchronization. Also, on the assumption that the base frame synchronization is established between the base stations and as long as the base frame synchronization can be established with the nearest base station, the same synchronization is substantially established also with the other base stations. Therefore, the synchronization is established with the nearest base station in the subband observed by the terminal. This symbol is a single symbol coupling two symbols as explained later with reference to FIG. 12. As long as the synchronization is established between the base stations, therefore, the sync symbol having a long GI can be received with the inter-symbol interference suppressed.

FIG. 27 shows the processing flow by which the base station determines the layout pattern.

The base station transfers in status to the pilot search mode 2701 with the arrival of the time to determine the pilot layout pattern. In this mode, the control channel transmission is provisionally stopped (2702). The base station search mode (2703) is set wherein the transmission timing of the base station is switched to the reception timing. The pilot pattern received and the receiving level are stored (3704). The operation mode is restored (2706) while the pilot pattern lowest in level among the pilot patterns received is used as a pattern to be transmitted by itself (2705).

With the configuration according to this invention, the mobile station sufficiently observes only the subband of 1.275 MHz. This is by reason of the fact that each base station transmits the sync channel in all the frequencies (f0, f1, f2, f3) and the base frame synchronization is established between the base stations, so that the surrounding base stations also transmit the synch channel at the same time point, with the result that the sync channels of all the surrounding base stations are transmitted also at the frequency received by the mobile station (f3, for example). The mobile station, if desirous of searching for the base station having the frequency f0, confirms the transmission pattern of the pattern 2201. Also, the mobile station, if desirous of searching for the base station of frequency f1, confirms the transmission pattern of the pattern 2202. FIG. 20 shows that although a plurality of base stations transmit the same frequency, the reuse rate is reduced and at most several base stations are sufficiently separated. In transmitting the signal with the pattern 2201, therefore, each symbol of the pattern 2201 is scrambled by the corresponding PN code series. At the receiving end, the signal of each base station can be separated by matching with the corresponding PN code series. As a result, the information of the same frequency can be divided.

Figure 28B:
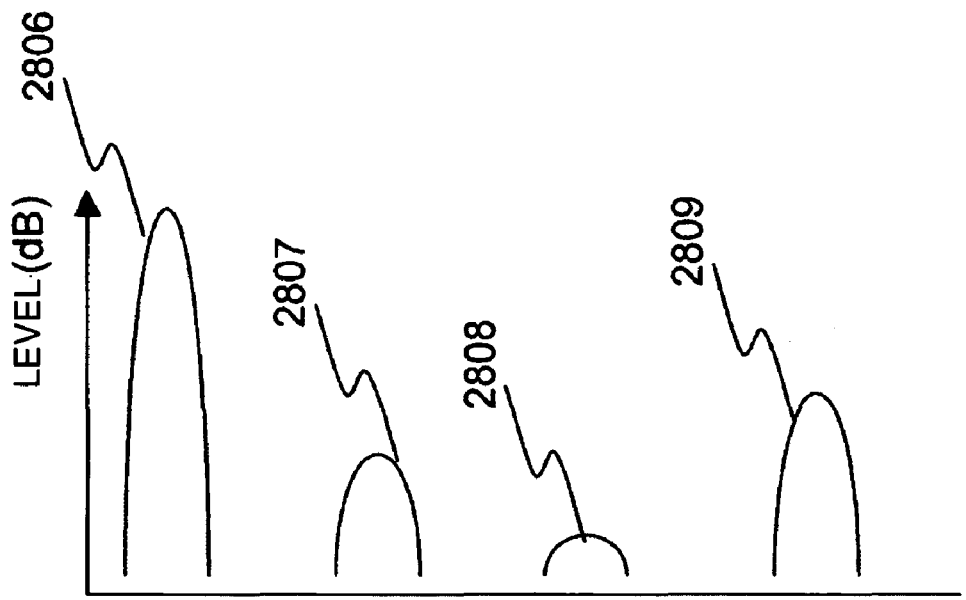
FIGS. 28A and 28B are diagrams showing the signal and level separated through a matched filter according to an embodiment of the invention.
Figure 28A:
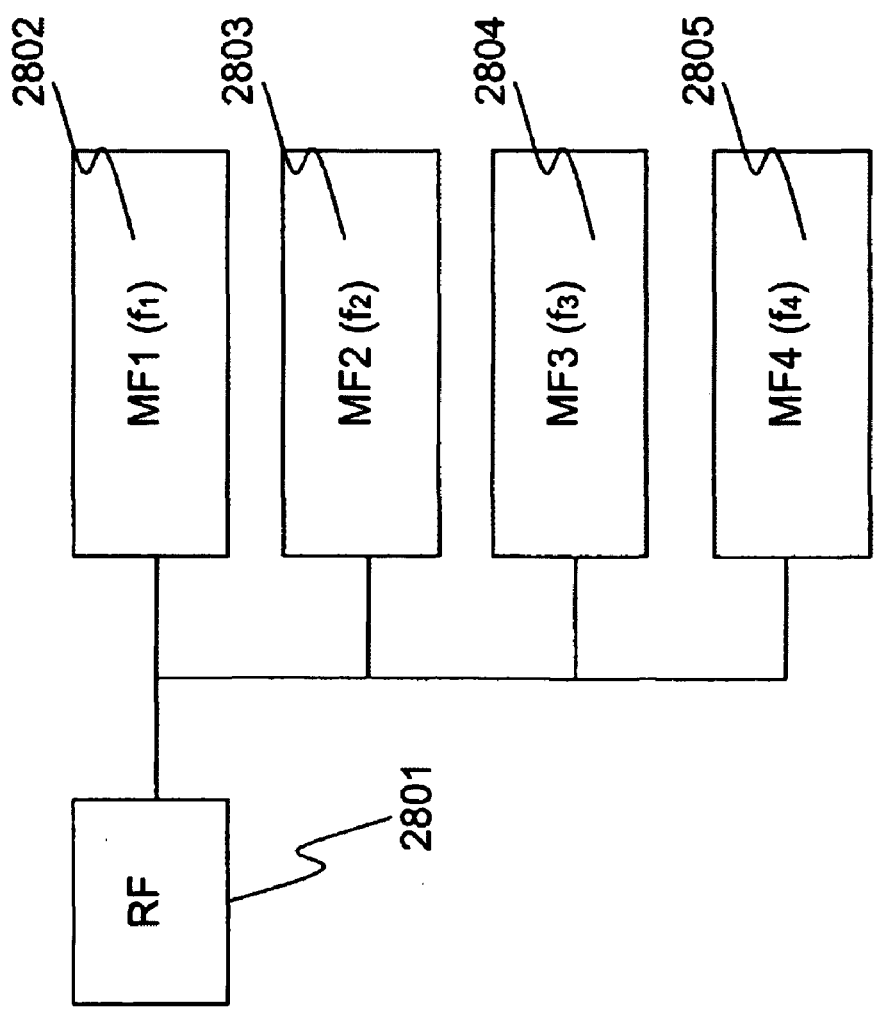

FIGS. 28A and 28B show an example of a matched filter.

The matching job can be carried out by the matched filter shown in, for example, FIGS. 28A and 28B. The signal received by the receiver RF 2801 through an antenna not shown is amplified and, after being down converted, converted into a baseband signal. The peak of the baseband signal thus converted is detected by the matched filter. By using matched filters of different patterns, a particular pattern (base station) of which the received power is strong can be distinguished. A series of operation makes possible the investigation (cell search) of the nearest base station. In FIGS. 28A and 28B, the signals (2806 to 2809) output from four matched filters (2802 to 2805) are compared with each other thereby to determine that the base station of the pattern of the signal 2806 is the nearest base station. This cell search operation completes the cell search operation in units of the base frame. The head of the base frame capable of this cell search can be configured at the rate of once every six times, for example, in respect of the TDMA frame of 5 msec. Then, the cell search once every 30 msec is possible, and therefore, Problems 3-1 and 3-2 are solved.

Figure 29:
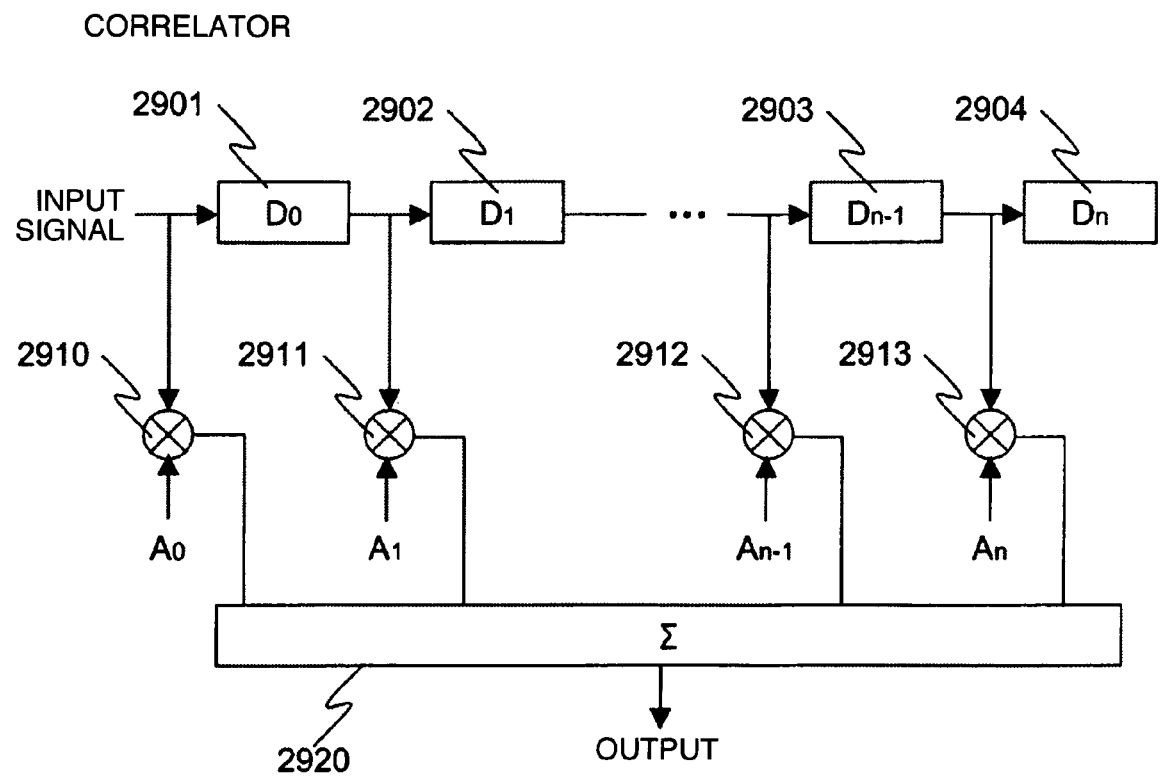
FIG. 29 is a diagram showing the configuration of an ordinary corrector.

According to the aforementioned embodiment, an example of the configuration having a plurality of matched filters is explained. Also in the case where one matched filter is used by time division multiplexing or the correlator shown in FIG. 29 is used, however, this patent has the same effect and is apparently applicable.

The configuration of the correlator is explained with reference to FIG. 29.

The signals converted into the baseband signal by the receiving means RF experience the delay by the time equal to the sample time in a plurality of delay elements (2901 to 2904). Then, tap coefficient a is multiplied in multipliers (2910 to 2913) and the addition is made by an adder 2920. By a series of the sum-of-products calculation, the correlation result with the pattern a is obtained.

Figure 12:
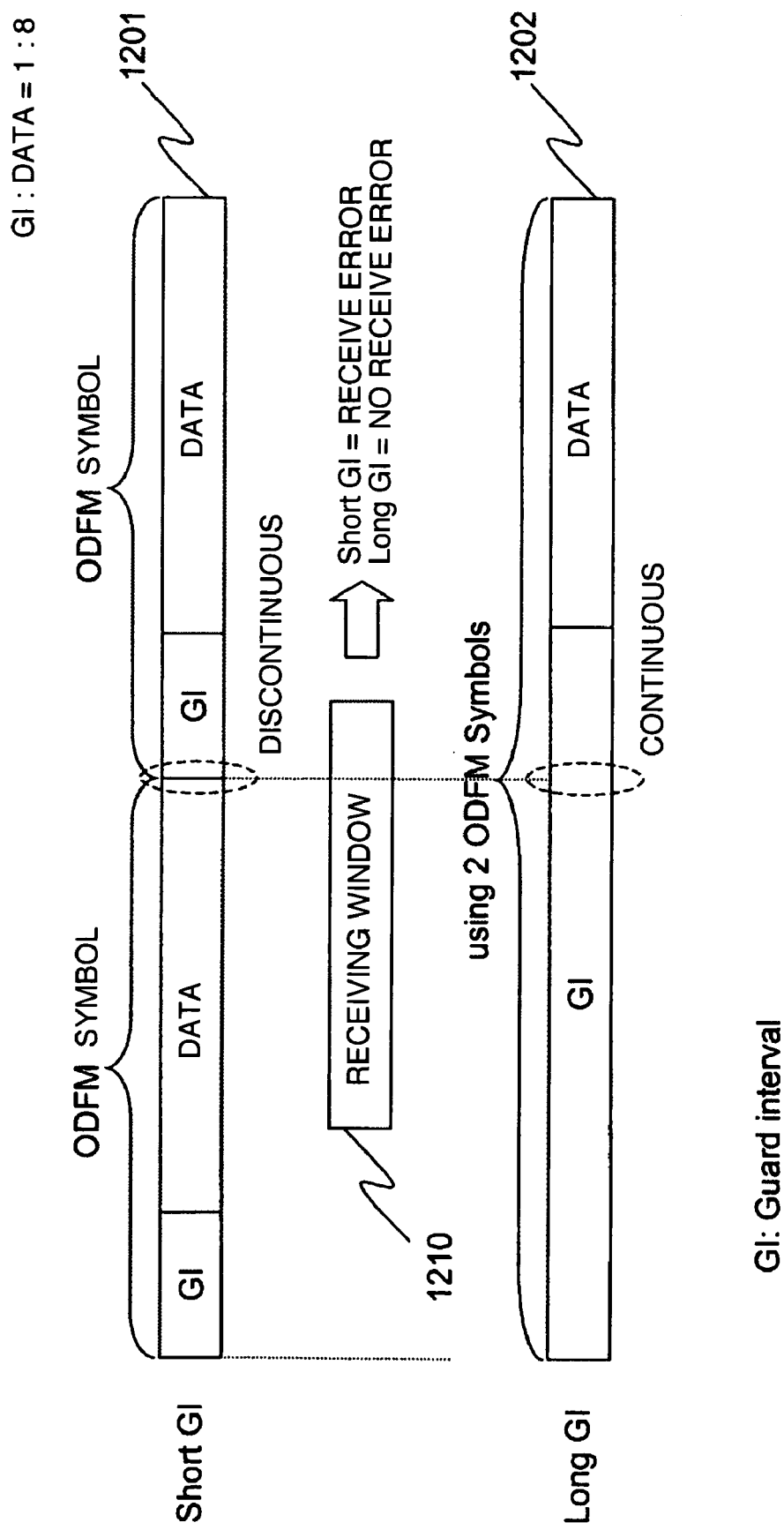
FIG. 12 is a diagram for explaining the frames having different GI lengths according to an embodiment of the invention.

In the case where the mobile station receives a signal from the non-synchronized state in OFDM, a case occurs in which the OFDM symbol is covered by the window 1210 of the mobile station at the timing 1201 shown in FIG. 12. In the process, the generation of a discontinuous point causes the interference as shown in FIG. 9 and adversely affects the adjacent bands and carriers. Especially in the case where the down link sync symbol is received, a plurality of far base stations are observed at the same time, and therefore, this problem is substantive and acute.

A method for avoiding these problems is shown in FIG. 29. The OFDM symbol includes a GI section for securing the synchronization and the data section for data transfer. The sync symbol 1901 shown in FIG. 19, as designated by 1202 in FIG. 12, is formed into a long GI structure with symbol connection and a lengthened GI (guard interval). Assuming that the receiving window (1210) of the mobile station is located at the position shown in FIG. 12, the aforementioned interference is caused in the short GI containing a discontinuous point of the symbol boundary. Under the effect of interference due to the timing shift of the signal from a nearby base station, the probability of a failure to receive from other base stations increases. With the long GI configuration having the GI length of not less than 1 OFDM symbol as designated by 1202 in FIG. 12, however, the continuous period is long and the aforementioned fear is remarkably improved. After a receiving success, the mobile station can increase the frame sync accuracy for subsequent reception of the OFDM symbol (1906, short GI in FIG. 19), and therefore, Problem 5-1 is solved.

This also can contribute to the power saving of the base stations. By transmitting only the control information in the common control channel with one subband, the transmission power of the base stations which otherwise might increase can be reduced. In this case, the mobile station selects the base station type high in receiving power, and by transferring to the subband transmitted by the particular type of the base station, the control information of the common control channel of the base station is acquired with the particular subband. FIG. 14 shows the common control channel transmission timing. Each base station transmits the common control channel at the down link control channel transmission timing (1410 to 1412). In the process, the base station 1401 transmits the sync signal and the pilot signal over the entire band of frequency f0 to fn, while the control information is transmitted only at the frequency f0.

FIG. 30 shows the contents of the control channel transmission according to an embodiment of the invention.

As shown in FIG. 30, the base station 1 transmits the pilot pattern A in all the frequencies f1 to f4 assumed to cover the whole band and transmits the control information only with the frequency f1. The base station 2 also transmits the pilot pattern B in all the frequencies f1 to f4 of the pilot pattern, and transmits the control information only with the frequency f2.

In similar fashion, the base stations 3 and 4 transmit the pilot in all the frequencies and the control information with the frequencies linked to the respective base stations.

Figure 31:
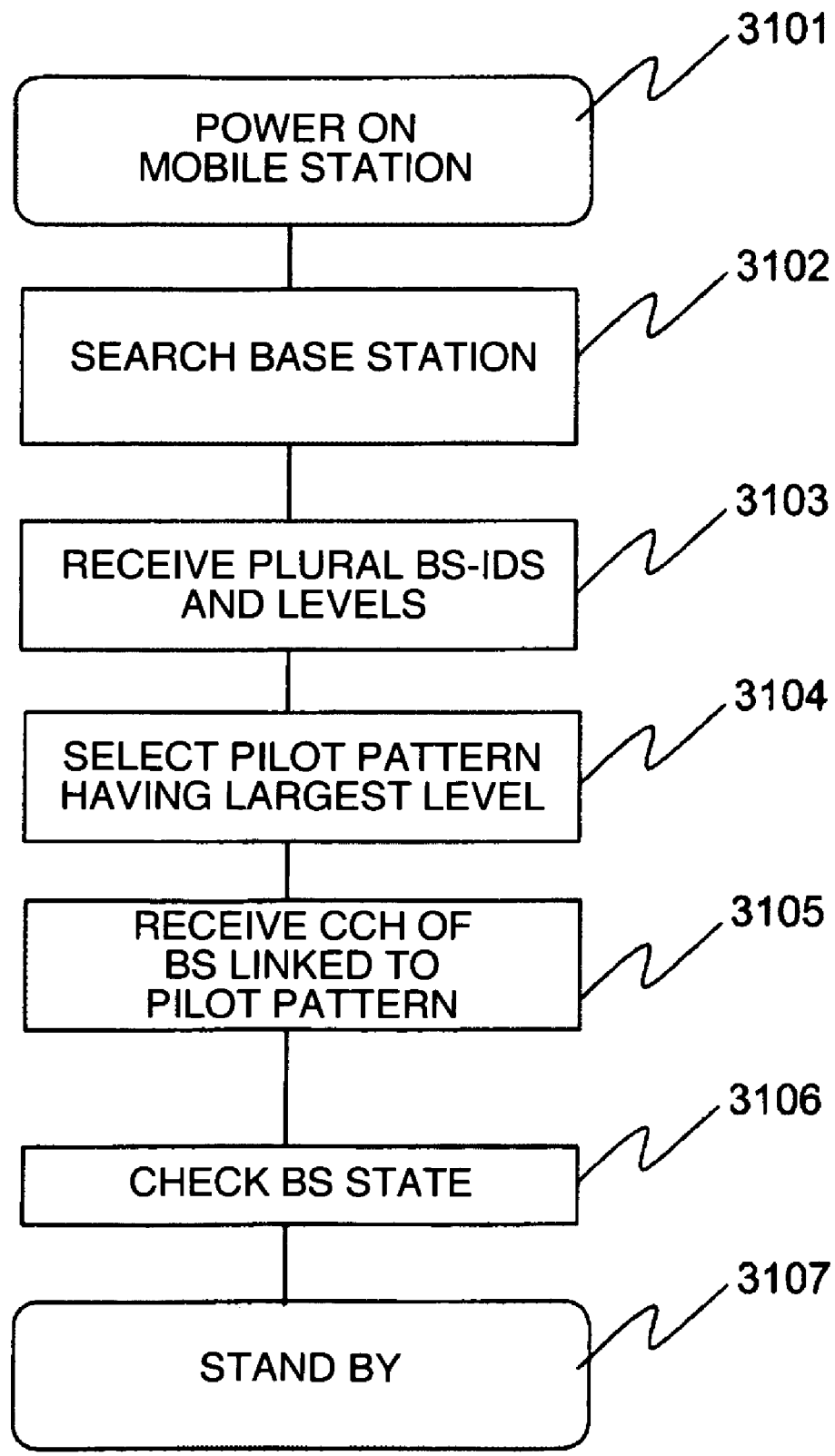
FIG. 31 is a diagram showing the processing flow for cell search of the mobile station according to an embodiment of the invention.

FIG. 31 shows the processing flow of cell search of the mobile station according to an embodiment of the invention.

The mobile station, as shown in FIG. 31, starts the cell search (3102) with such a trigger as power on, acquires a plurality of base station IDs and, measuring the power of each base station (3103), retrieves the pilot pattern of the highest receive power (3104), receives the control information of the subband linked to the selected pilot pattern (3105), and checking the contents of the announcement as to whether the standby poses no problem in the presence of the information such as restriction, enters the standby mode (3107).

A method of retrieving the pilot pattern (3104) is explained. As shown in FIGS. 28A and 28B, the mobile station receives the pilot signal multiplexed in RF band and separates it into each pilot signal through the matched filters (2802 to 2805). The receive power level of the pilot signal separated is measured. In FIGS. 28A and 28B, the level (2806) of the pilot signal separated by the matched filter 2802 represents the highest power, which is thus selected by the matched filter. This makes it possible to shorten the time before selection of the base station from the initial state of the mobile station, and therefore, the high-speed handover and the reduction in power consumption are made possible, thereby solving Problem 3-1 that the search time must be shortened and Problem 3-2 of the power consumption due to frequent search. Incidentally, although the aforementioned embodiment represents a means for a case in which the mobile station is synchronized, the use of the sync signal and the pilot signal for the whole subband as a broad band of 1.275 MHz apparently improves the synchronization accuracy as compared with the narrow-band single carrier in the conventional method.

As explained above, once the cell search time of the mobile station can be shortened, the handover time during communication can also be shortened.

Figure 32:
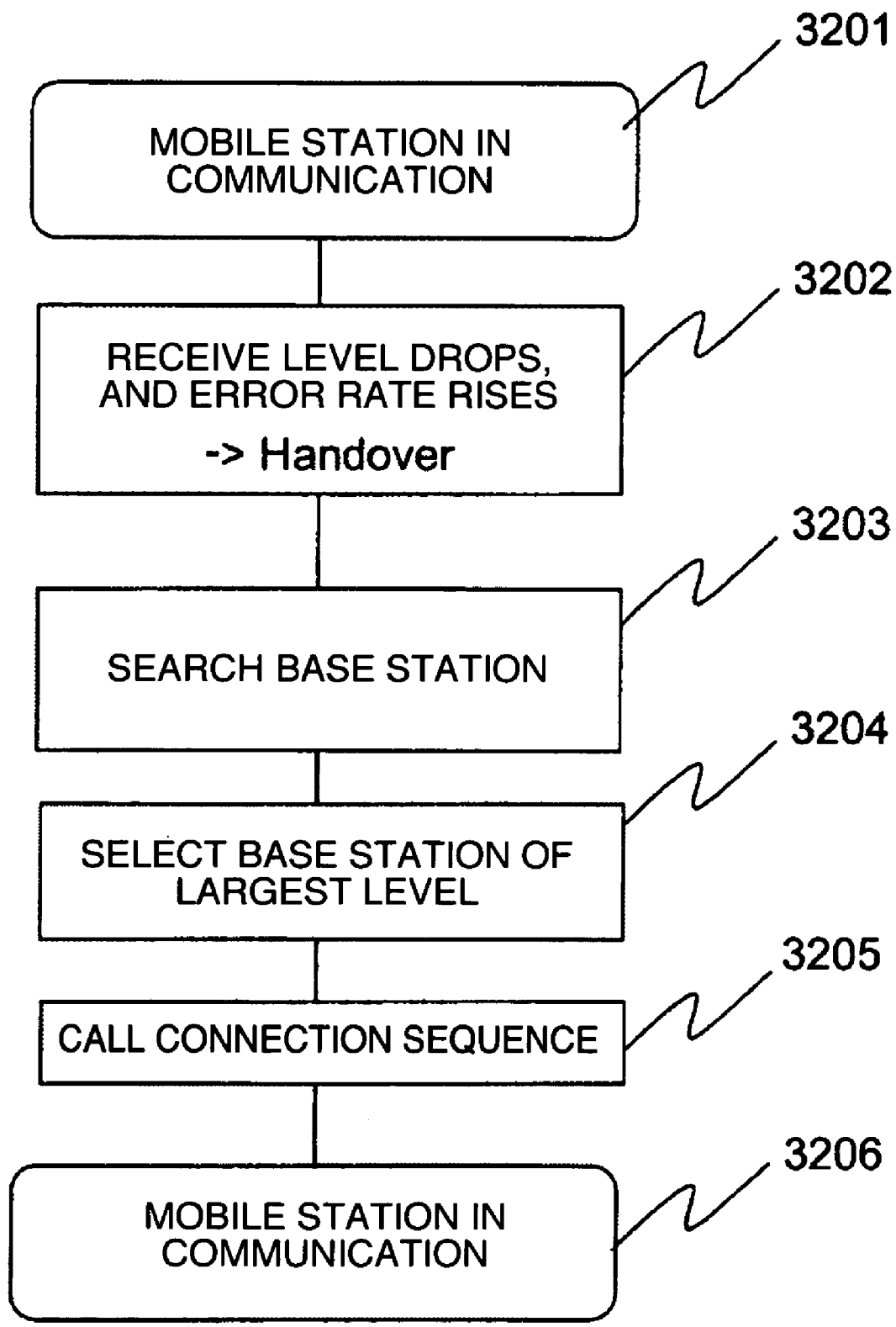
FIG. 32 is a diagram showing the processing flow of the handover executed by the mobile station.

FIG. 32 shows the processing flow for the mobile station at the time of handover.

This is an example of a case in which the mobile station has only one RF system. The mobile station constantly monitors the receiving level and the error level during communication, and in the case where the receiving level drops and the error rate rises (3202), the handover is activated. After handover activation, the surrounding base stations are searched (3203), the base station with the highest receiving level is selected (3204), and the call connection sequence is started (3205) thereby to restart the communication with a new base station to which the communication is switched. In this series of processes, the processes requiring considerable time are the search of the surrounding base stations (3203) and the call connection sequence (3605). According to this invention, the time to search the surrounding base stations (3203) is shortened, with the result that the handover time can be shortened and Problem 3-1 of shortening the search time is solved.

[Structure of Communication Slot]

The communication slots have such a structure that the communication is possible with the entire slot timing as designated by 1503 in FIG. 15. Since the slots 1 and 5 in the base frame timing are allotted to the control channel transmission timing as indicated by 1502, however, the communication is made possible with other than these slots.

Figure 33:
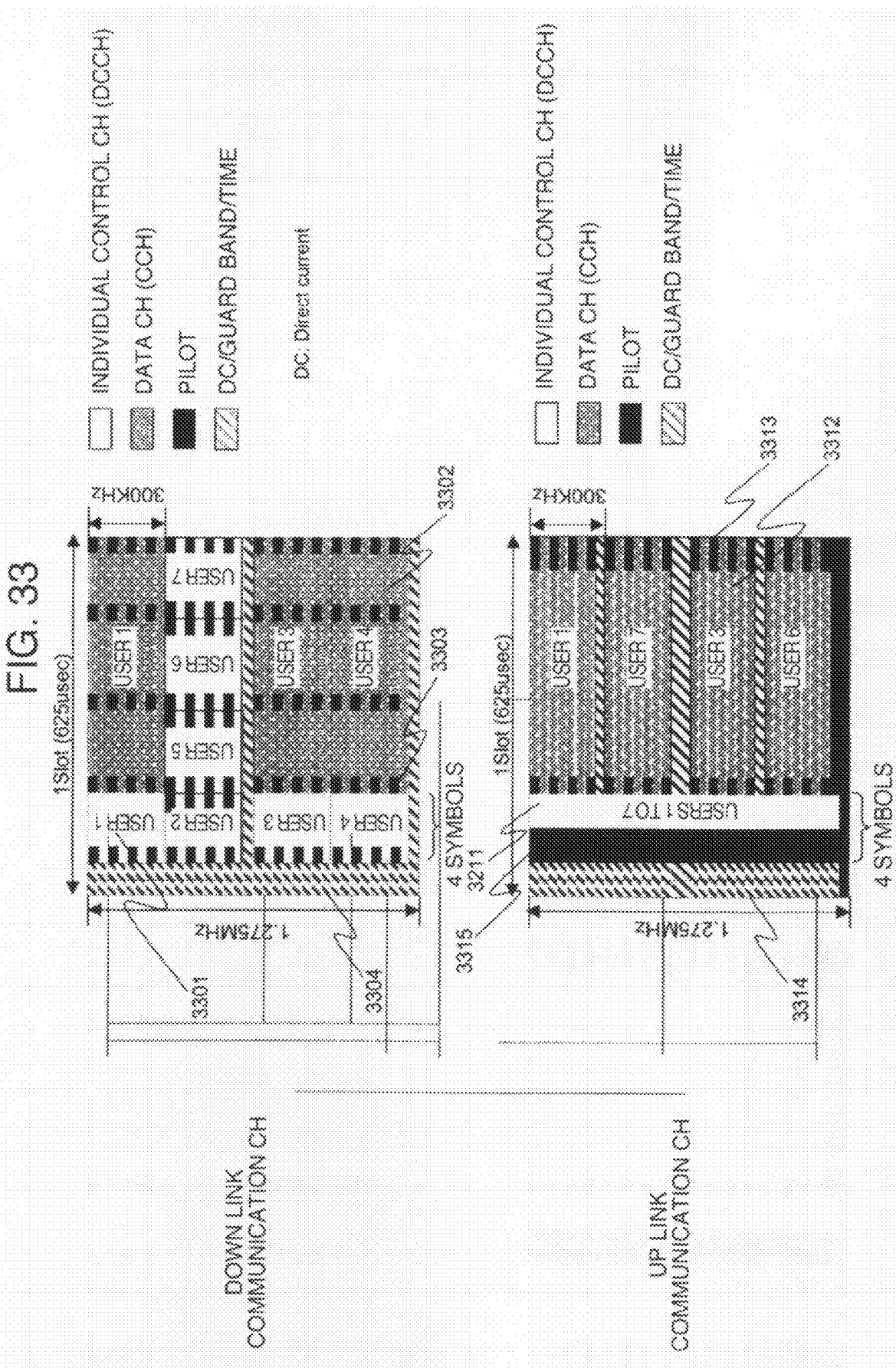
FIG. 33 is a diagram for explaining the down link individual control channel structure and the up link individual control channel structure according to an embodiment of the invention.

FIG. 33 shows the OFDM symbol format structure of the up link/down link communication channels.

The down link communication channel is configured of a pilot signal 3303, an individual control channel 3301, a data channel 3302 and a guard carrier 3304. The individual control channel 3301, including information such as the power control information, the communication channel quality, the communication response ACK and the channel allotment, is used for individual control of each mobile station during communication. The data channel is the one for transmitting/receiving the user data. The data channel is in units of the subchannel of 300 kHz, one of the four parts into which the subband of 1.275 MHz is subdivided. Either one user can use all the channels or a plurality of users can use each subchannel. Thus, both low and high speed best-effort communication can be realized. One tile (34 subcarriers multiplied by 190 FDM symbols) can be divided into four parts in frequency or time direction.

Figure 34:
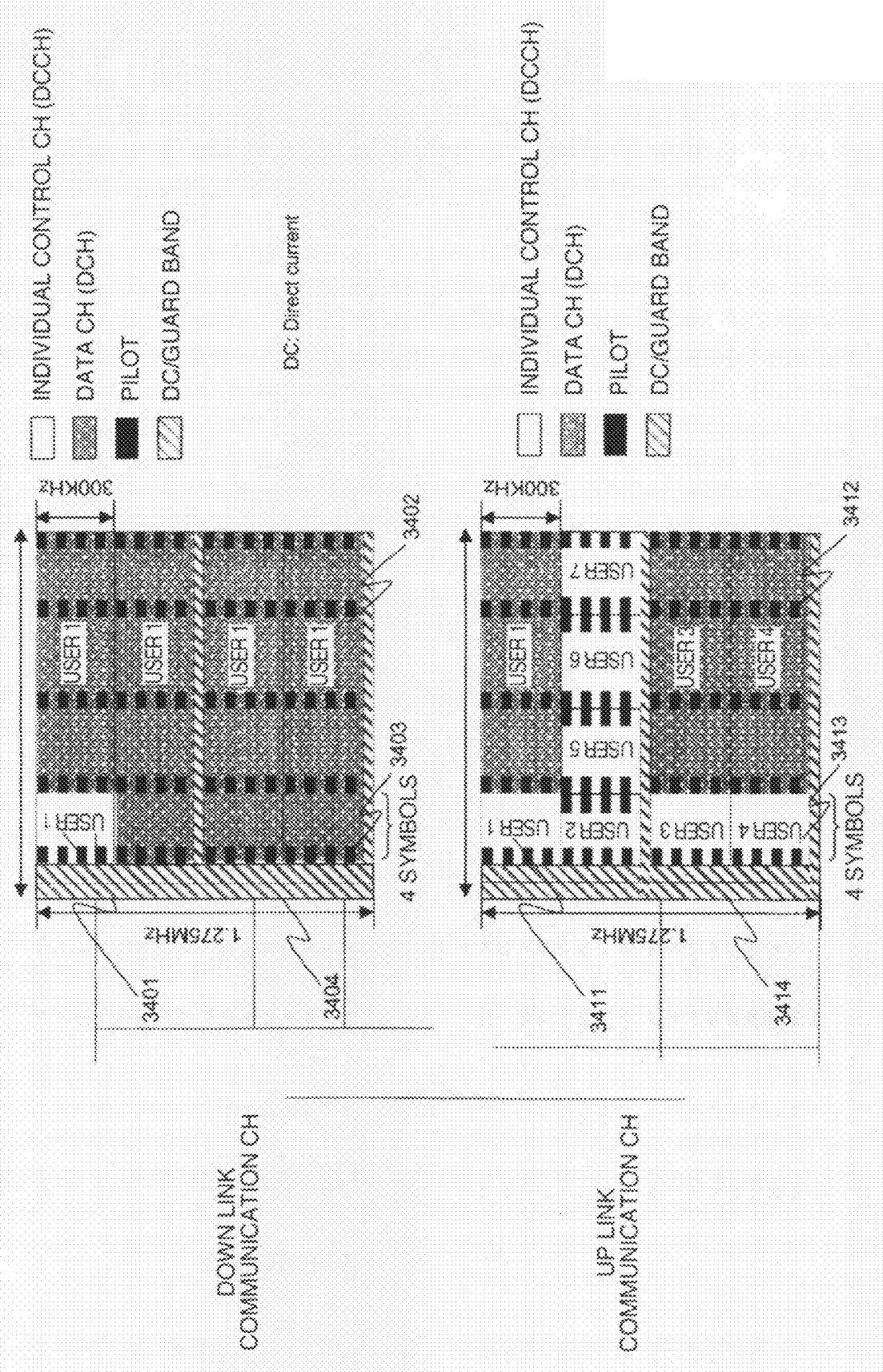
FIG. 34 is a diagram for explaining a method of using the down link individual control channel according to an embodiment of the invention.

FIG. 34 shows a method of using the down link individual control channel according to an embodiment of the invention.

The individual control channel and the data channel can be freely allotted. As shown in FIG. 34, for example, only one element (3401) is used as an individual control channel for the user 1, and the other parts of the tile all make up the data channel (3402) for the user 1 and the pilot channels (3403) to receive it (upper part of FIG. 34). As an alternative, the four subchannels in frequency direction are allotted to "user 1", "individual control channel", "user 3" and "user 4", respectively, the individual control channel (3411) for the user N is arranged at the head portion of the subchannel for the user N (N=1, 3, 4), and the data channel (3412) is arranged behind the individual control channel (3411) (lower part of FIG. 34). In the subchannel for each individual control channel, the individual control channels for a plurality of other users are arranged. A pilot signal (3413) is also arranged whereby each signal can be received by beam forming with each signal set to each terminal station using an array antenna. In the lower part of FIG. 34, one tile can be shared by the terminal stations of four or more users, thereby making it possible to produce the user diversity effect.

The up link data channel, like the down link data channel, is configured of pilot signals 3313 and 3315, an individual control channel 3311, a data channel 3312 and a guard carrier 3314. The data channel is the one for communication of the user data, and like the down link, has a subchannel configuration in units of 300 kHz, in which either one user can use all the subchannels or the subchannels are used for each user. As a result, the low- to high-speed best-effort communication can be realized also for the up link. The individual control channel 3311 makes up a code in combination with the pilot 3315 in the first stage, and constitutes OFCDMA by which the code unique to the mobile station is scrambled into M series, for example, in response to the instruction from the base station. Since the scramble code is unique for each mobile station, the control information for a plurality of users, if multiplexed, can be demultiplexed later. In this individual control channel, therefore, the terminal transmission power is controlled in such a manner as to secure a constant receiving quality at the base station constituting the receiving end by power control operation. The information sent through the individual control channel include the communication response ACK, the down link channel quality information, etc., which is the channel for communication of the individual control information with the mobile station. Also, in this case, the pilot is transmitted not by CDMA but by OFDMA. The base station, by the estimation of the propagation path of each 300 kHz from the pilot information of each 300 kHz, can estimate the propagation path in the band of 1.275 MHz different in frequency characteristic with the resolution of 300 kHz. Using the result of this propagation path estimation, the array antenna can be controlled on down link. Thus, Problem 1-1 can be solved.

[Realization of Block Hopping]

In the packet method, HARQ (hybrid automatic repeat request) assumes importance as a relief at the time of occurrence of a packet error. According to this embodiment, HARQ is executed with the same slots in the same subchannel as a pair. The first slot of the up link and down link, for example, corresponds to the fifth slot thereof. In this way, the down link of the Nth slot and the up link of the (N+4)th slot correspond to each other. In the down link HARQ, the base station transmits the signal with the Nth slot of the Kth TDMA frame, and the mobile station, in accordance with the receiving result, transmits ACK or NACK in the (N+4)th slot of the same TDMA frame, In the case where ACK is transmitted, the corresponding channel is opened, while in the case of NACK transmission, the second signal transmission having the same information source is carried out in the Nth slot of the (K+1)th TDMA frame.

In the Nth signal transmission, the situation of the propagation path is desirably changed considerably.

Figure 35:
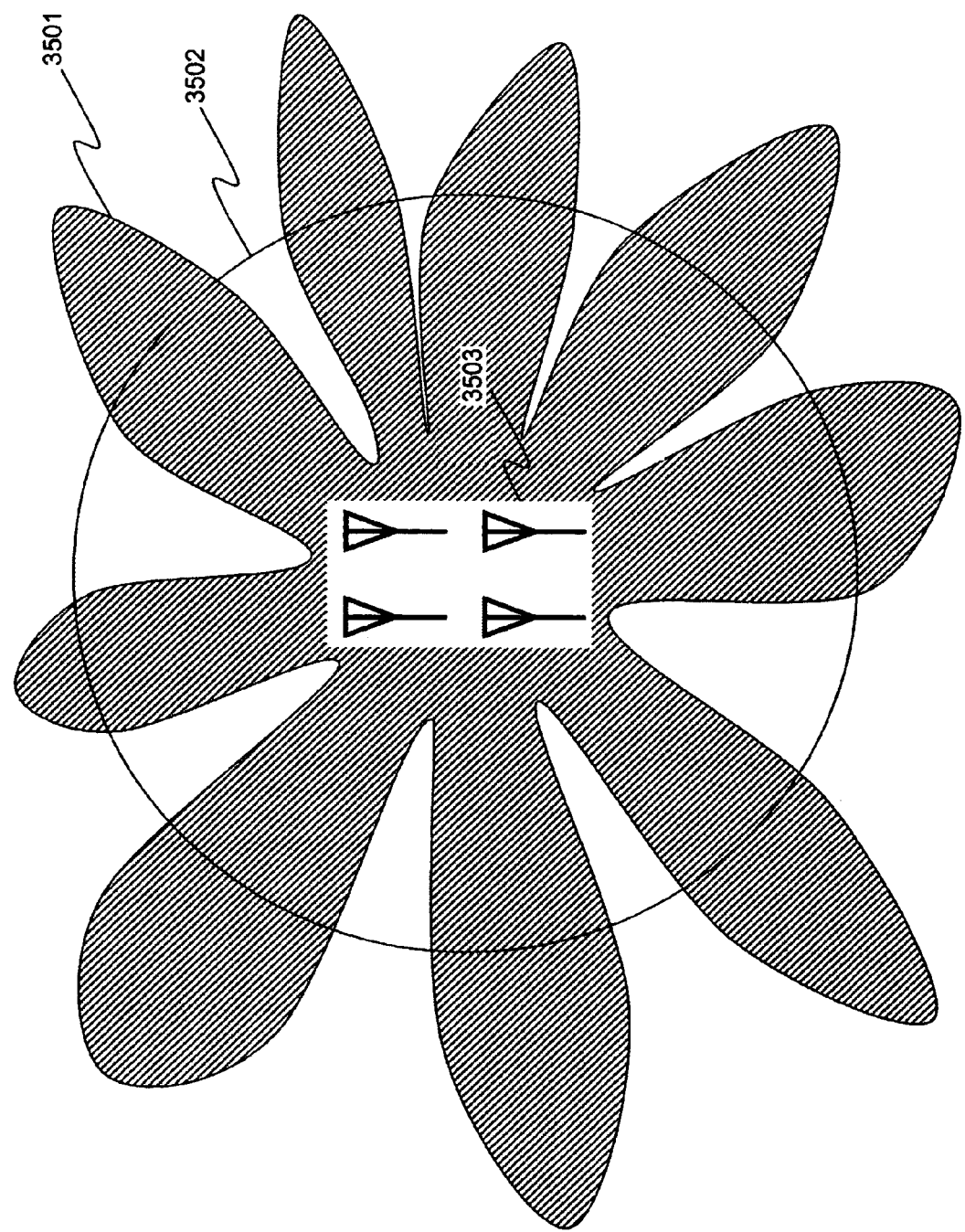
FIG. 35 is a diagram showing the down link beam forming.

FIG. 35 shows the down link beam forming.

In the case of an array antenna with a nondirectional antennas installed several wavelengths apart, the directionality pattern is such that a multiplicity of grating lobes are seen as shown in FIG. 35. Consider the interference between a plurality of base stations. In the case where the mobile station A connected with the base station A is in conflict with the mobile station B connected with the base station B in the first HARQ transmission, the interference pattern is not changed as long as the same frequency continues to be used. Specifically, both the base stations A and B transmit the signal to the mobile stations A and B, respectively, in the Nth slot of the Kth TDMA frame, and carry out the second signal transmission with the same information source in the Nth slot of the (K+1)th TDMA frame.

Figure 36:
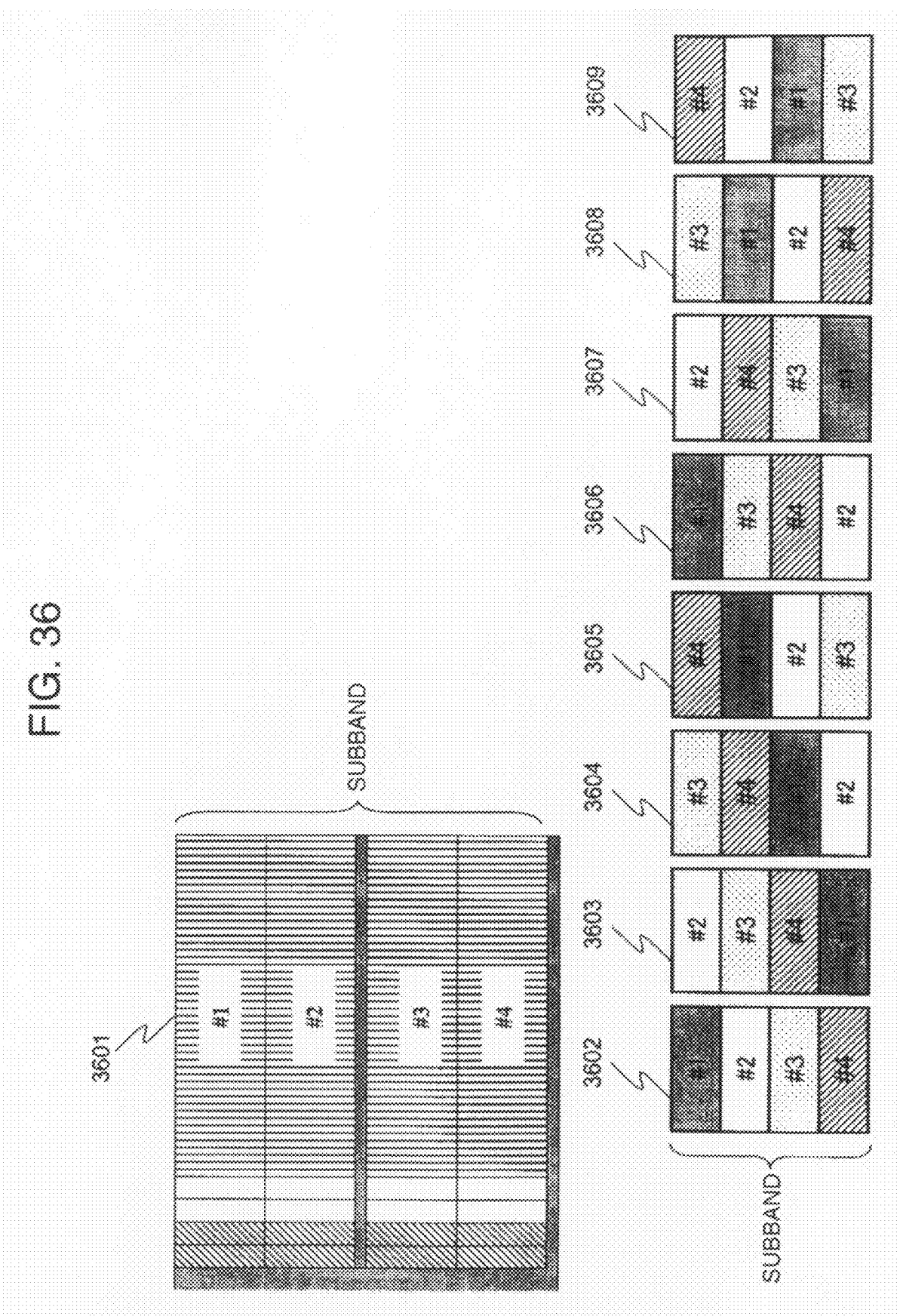
FIG. 36 is a diagram for explaining the HARQ application to the communication channel structure according to an embodiment of the invention.

In view of this, as shown in FIG. 36, the subband formed of one tile (3601) is divided into four subchannels in terms of frequency, and using each subchannel, a signal is transmitted to the individual mobile stations. Each subchannel is allotted a logical number (#1 to #4). In HARQ execution, a session is allotted to each logical number. The logical number is scrambled at the time of actual physical arrangement in frequency. The lower part of FIG. 36 shows the manner of such arrangement. The abscissa represents the direction of time, and the ordinate the direction of frequency. The logical subchannel #1 is allotted physically to the subchannel (uppermost) lowest in frequency in the first TDMA frame (leftmost), and to the subchannel of the highest frequency (lowermost) in the second TDMA frame. With the advance of time, therefore, hopping is executed in accordance with a predetermined pattern. When a plurality of base stations are viewed, each base station carries out the hopping with a unique phase (the phase of the hopping pattern, i.e. the position counted from left in the lower part of FIG. 36), and moved one leftward each time the TDMA frame is updated. By doing so, the hopping pattern becomes independent between the base stations, and a different mobile stations is in conflict for each different number of times of HARQ transmission. As a result, the difference in antenna pattern is caused, and the antenna pattern of the base station B as viewed from the mobile station A is different for each number of times of HARQ transmission, thereby increasing the HARQ effect.

Figure 37:
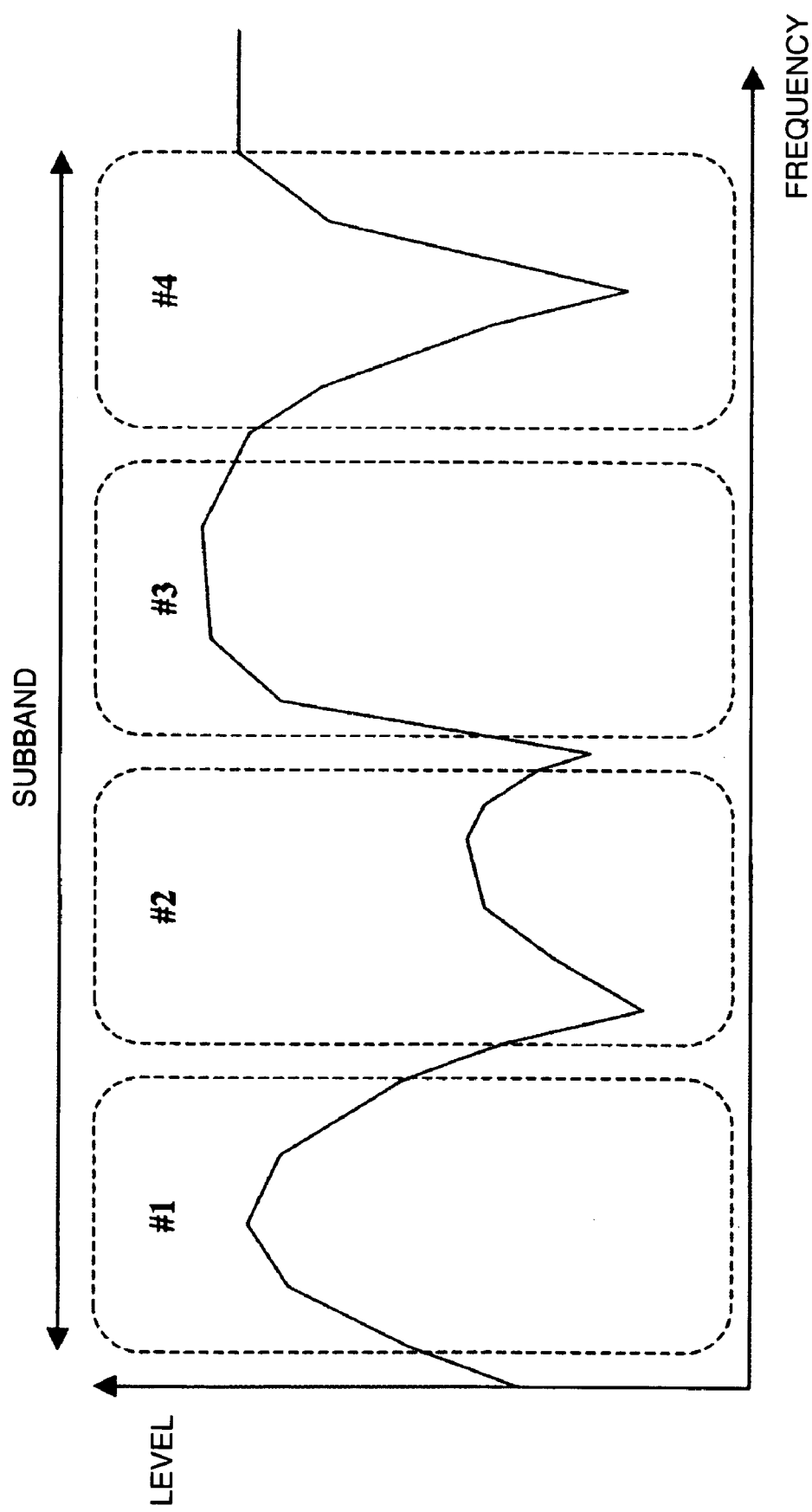
FIG. 37 is a diagram for explaining the occurrence of a packet error under the effect of the frequency selective fading.

FIG. 37 is a schematic diagram showing that the frequency characteristic of the propagation path is varied from one subchannel to another.

Depending on the delay diffusion of the propagation path and in spite of the correlation between the subchannels, different propagation paths have different characteristics. Simply by hopping this, the radio characteristics can be differentiated for each number of times the HARQ transmission is made. The block hopping in which the hopping is made for each subchannel, coupled with HARQ, therefore, can produce a high improvement effect.

Nevertheless, a problem is encountered here. Execution of the block hopping requires the subchannel hopping on down link, and this hopping is required to include the directionality pattern of the array antenna as described above. In spite of the correlation for each subchannel as described above, the characteristics of the propagation paths are different. To obtain the array pattern for down link, the propagation path is required to be estimated on up link. Especially in packet-type communication, the information on up link is not necessarily existent on down link as a pair, and the array antenna for down link cannot be controlled. Especially in the case of OFDMA, the resource allotment is accompanied by frequency spread and the efficiency can be improved by free allotment. Once the frequencies of up link and down link are linked to each other for controlling the array antenna, however, the freedom of frequency resource allotment is restricted. As compared with the free channel allotment, therefore, the problem of a deteriorated frequency utilization rate is posed.

Figure 4:
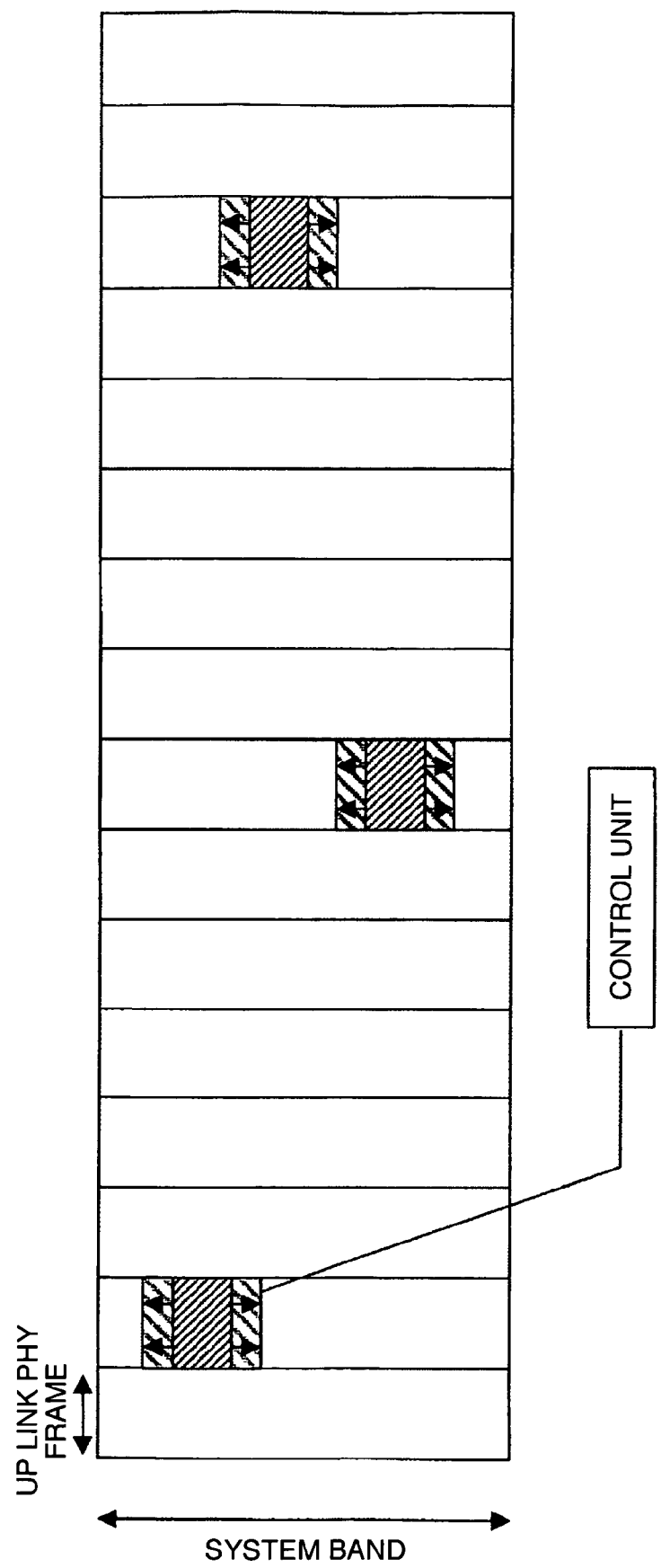
FIG. 4 is a diagram showing the configuration of an up control channel.

FIG. 4 shows the structure of the up link control channel according to 3GPP2 C30-20060626-054R2. In this example, the up link control channel is hopping on the frequency axis. By using the control channel hopping this way, the propagation path of each frequency can be known. Also in this method, however, the period of propagation path estimation is lengthened depending on the hopping period, and the assumption is disrupted that the up link and down link propagation path characteristics in TDD are substantially identical with each other.

The propagation path has a frequency characteristic. Especially in a system having the antenna configuration with antennas arranged in spaced relation with each other, the change in the frequency characteristics (frequency selectivity) tends to increase, and the propagation path estimation is difficult according to the conventional method dependent on the hopping period.

Figure 5:
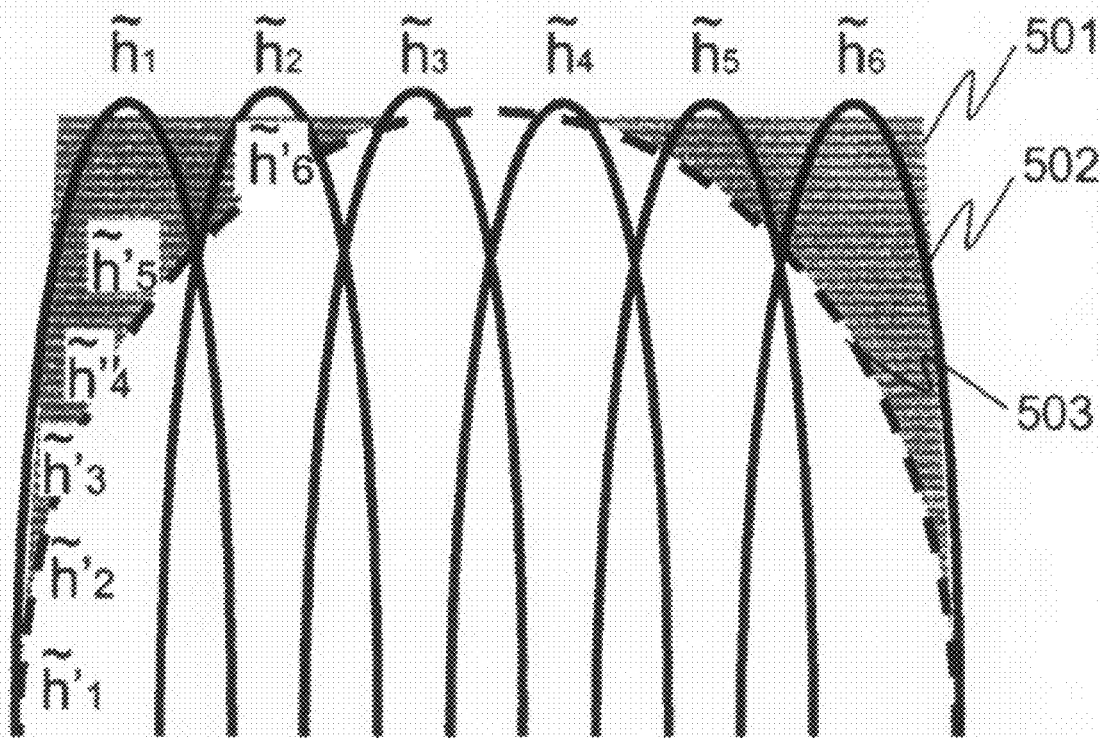
FIG. 5 is a diagram showing the spectra of OFDM and CDMA.
Figure 6:
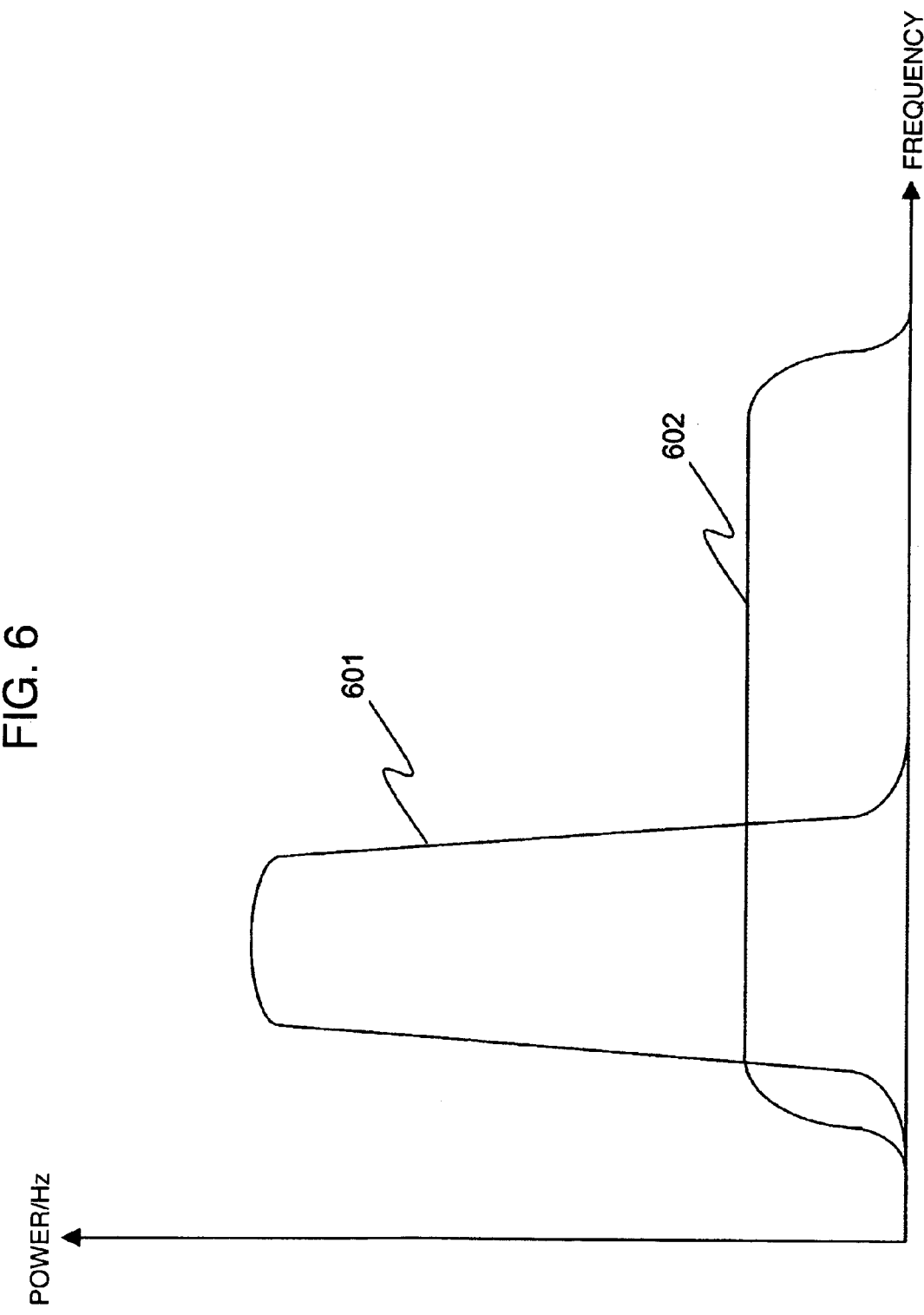
FIG. 6 is a diagram showing the relation between frequency and power of CDMA and OFDM.
Figure 11B:
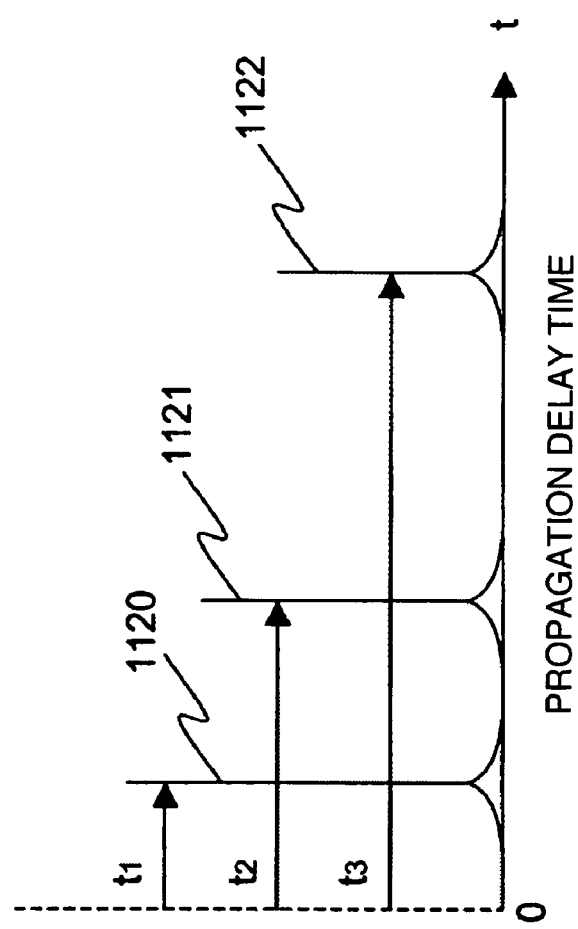
FIGS. 11A and 11B are diagrams for explaining the propagation delay.
Figure 11A:
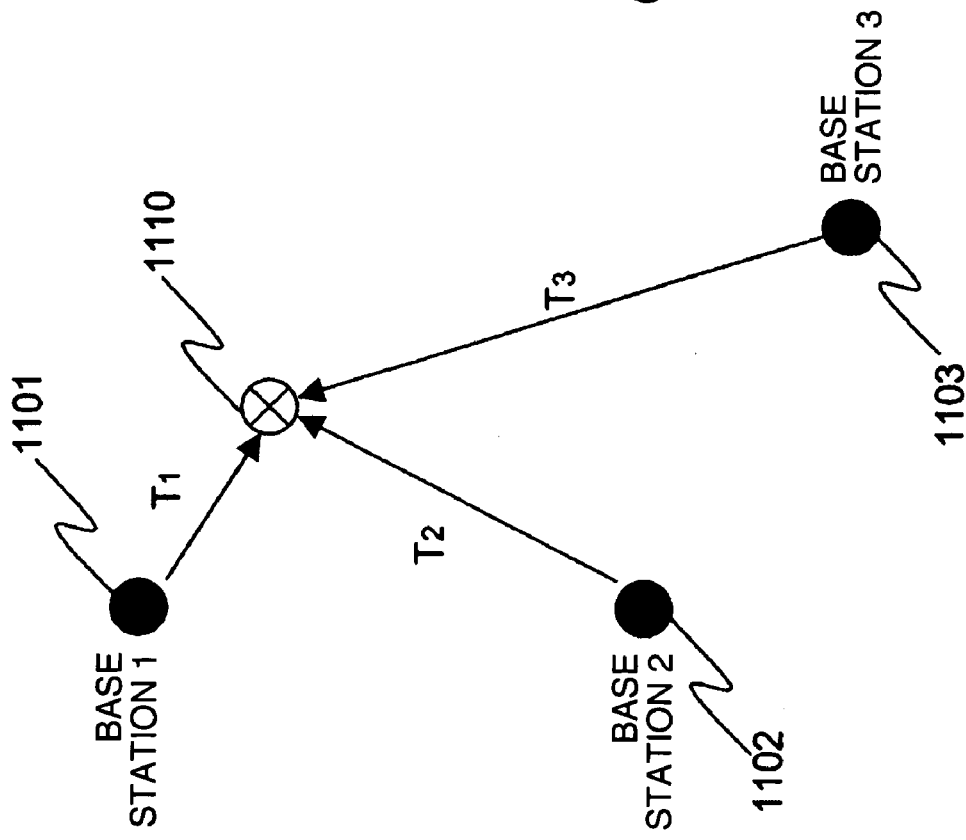

Further, 3GPP2 C30-20060626-054R2 discloses the control channel transmission which produces the frequency diversity effect by the broadband CDMA transmission on up link. The signal transmitted by CDMA is required to be designed to prevent the interference with other OFDM signals using the filter. As the result of the filter limitation, as shown in FIG. 5, the gain for the band (501) cut by the filter is reduced as compared with the OFDM signal, and therefore, sufficient propagation path information cannot be obtained. With the OFDM signal (502), assume that the propagation path information for each channel is given as $$\tilde{h}_n \quad \text{[Expression 1]}$$

Then, the average propagation path estimation result for the 300 kHz band is given as $$<\tilde{h}> = \sum_n^N \tilde{h}_n / N \quad \text{[Expression 2]}$$

With the CDMA signal (503), on the other hand, the portion (501) short of the gain exists, and the average propagation path estimation result is expressed as $$<\tilde{h}'> = \sum_n^N W_n \tilde{h}' / W \qquad \text{[Expression 3]}$$

resulting in a weighted propagation path estimation result, and the estimation sufficiently reflecting the information for the portion (501) short of the gain cannot be effected. Also, in the case of the block hopping, the array weight reflecting the propagation path estimation result for each 300 kHz is desirably determined. According to CDMA, however, the average propagation path estimation result over the whole subband of 1.275 MHz is obtained, thereby posing the problem that the propagation path cannot be estimated for each channel of 300 kHz making up the subchannel.

The up link according to this embodiment has the structure shown in FIG. 33. Specifically, it is configured of pilot signals 3313 and 3315, an individual control channel 3311, a data channel 3312 and a guard carrier 3314. The individual control channel 3311 makes up a code mark together with the pilot 3315 in the previous stage and makes an OFDMA such as the code unique to the mobile station is scrambled by M series in accordance with an instruction from the base station. The scrambled code is unique for each mobile station, and therefore, the control information for a plurality of users, if multiplexed, can be demultiplexed later. Using the up link individual channel, the transmission power of the mobile station is controlled by the base station of the receiving end to secure a predetermined reception quality. The information sent through the individual control channel include the communication response ACK and the down link channel quality information. Thus, this channel is for communication of the individual control information with the mobile station. Also, in this case, the pilot is transmitted not with CDMA but with OFDMA. The base station estimates the propagation path for each 300 kHz from the pilot information for each 300 kHz, so that the propagation path can be estimated for the band of 1.275 MHz having different frequency characteristics with the resolution of 300 kHz. Using this propagation path estimation result, the array antenna can be controlled on down link. Thus, Problem 1-1 can be solved.

Figure 38:
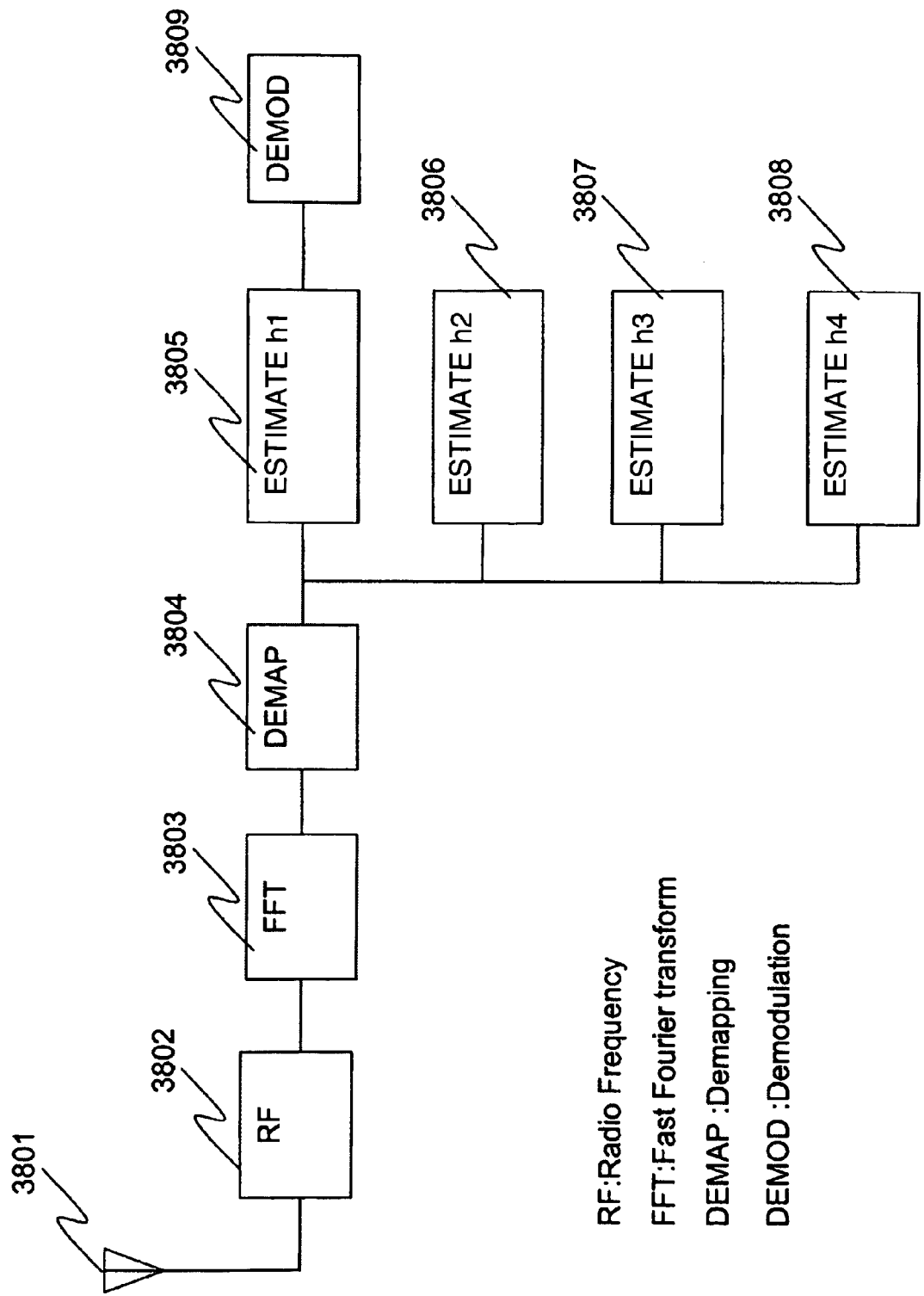
FIG. 38 is a diagram showing the configuration of a receiving system according to an embodiment of the invention.

FIG. 38 shows a configuration of the receiving system.

In FIG. 38 showing the configuration of the mobile station, the data transmitted are coded by channel in a MOD unit (3801). The signal coded by channel is scrambled with the PN code together with the pilot signal by a PN coding unit (3802). The signal thus scrambled is input to a MAP unit (3803), modulated by QPSK and mapped onto the frequency. The modulation signal thus mapped is input to an IFFT unit and converted from the frequency-domain information into the time-domain information. The signal in time domain is converted into a radio frequency by a RF unit (3804) and transmitted from an antenna.

Figure 39:
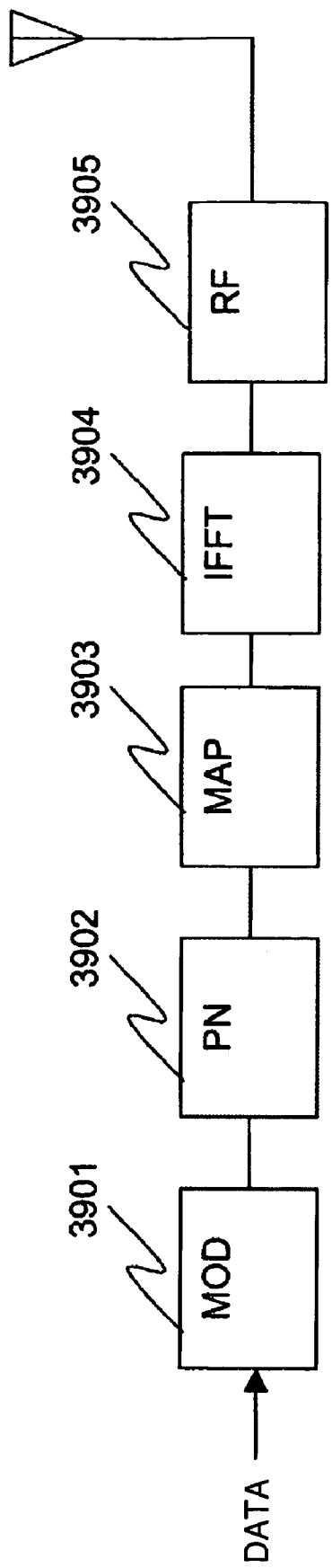
FIG. 39 is a diagram showing the configuration of a transmission system according to an embodiment of the invention.

FIG. 39 shows a configuration of the transmission system.

FIG. 39 is a diagram showing the configuration of a base station. The signal received through an antenna (3901) is converted into a baseband signal by a RF unit (3902), and by a FFT unit (3903), converted from the time-domain signal to the frequency-domain signal. The FFT unit forms a window at an appropriate timing extracted by a timing extraction unit not shown, and by removing GI, executes the FFT process. The signal subjected to the FFT process is input to a DEMAP unit (3904), and a signal is retrieved from the mapping in frequency domain. The feature of this patent is that the propagation path is estimated by dividing the retrieved information mapped on the frequency domain into subchannel. In FIG. 39, the propagation path estimation units (3905 to 3908) correspond to this portion. Each propagation path estimation unit estimates the propagation path of each subchannel (corresponding to #1 to #4 of 3601 in FIG. 36) divided. In the case where the receiving quality in one subframe is not sufficient for propagation path estimation, a plurality of propagation path estimation results received using a plurality of TDMA frames may be added to assure the propagation path estimation higher in accuracy.

The obtained propagation path estimation result can be used as a down link array weight by complex conjugation.

Figure 3:
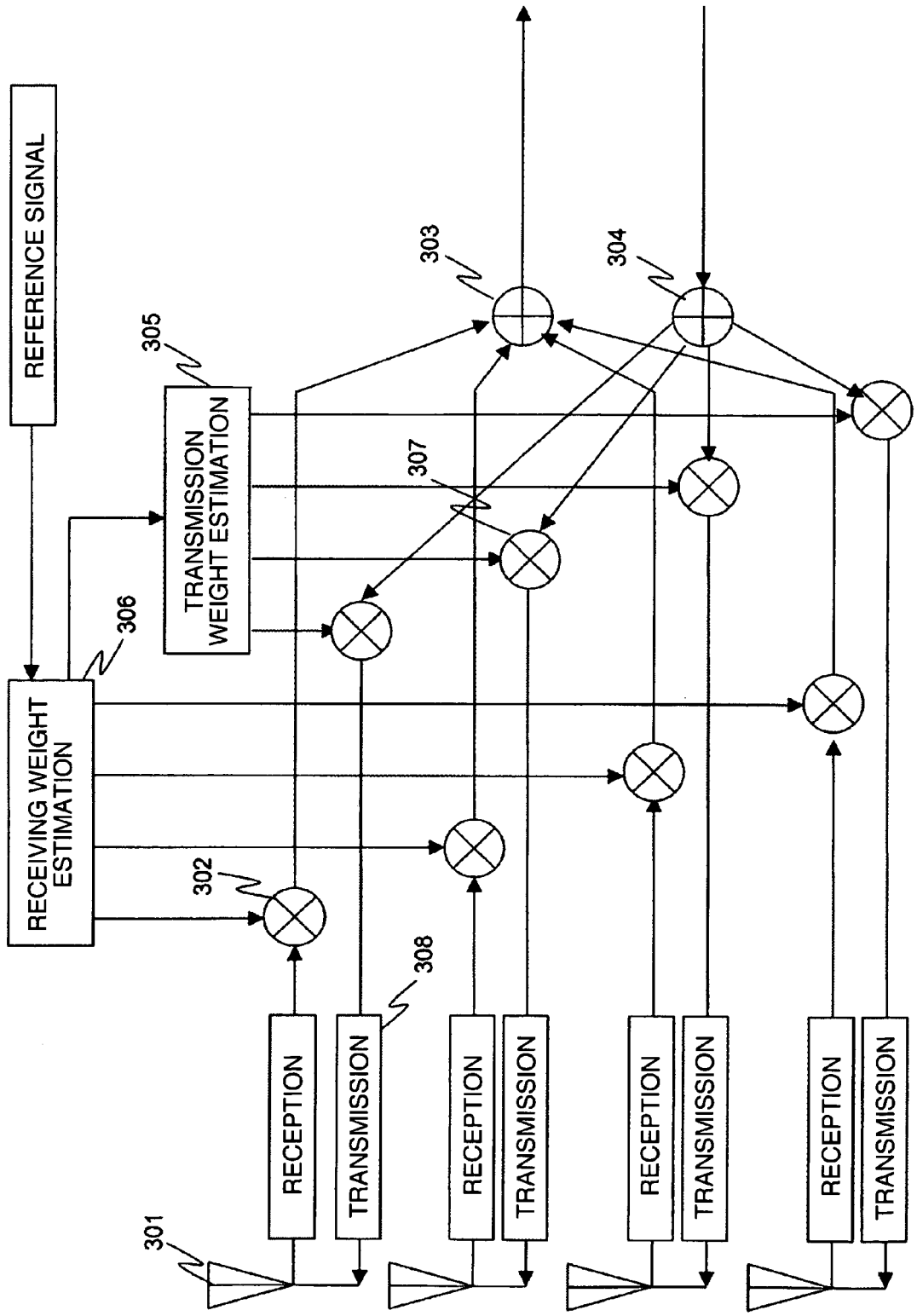
FIG. 3 is a circuit concept diagram for explaining the implementation of beam forming.

FIG. 3 shows the configuration of a BF unit for integrating the down link weight into a signal.

In FIG. 3, the signal transmitted is copied into the number of antennas by the MUL unit (304). The signals thus copied are multiplied by the down link array weight in the integrator (307), converted into the radio frequency in the transmission RF unit (308) and transmitted from the antennas (301). According to an embodiment of this patent, the up link and down link are paired in units of subband but not in units of subchannel. Therefore, it is possible that the data is transmitted only along the down link. As a result, the wireless resource allotment for down link is not restricted by such restraints that the up link and down link are required to be linked to each other. As a result, the resources can be allotted freely and Problem 1-1 can be solved.

[16. System Description]

FIG. 14 shows an example of the system configuration. The system is configured of base stations (BS) 1401 to 1403 and mobile stations (1404 to 1406) connected to an IP network (1400).

Between the base stations and the mobile stations, data are transmitted and received according to the TDMA-TDD communication scheme. The ODFM is used as a modulation scheme. The signals transmitted and received are classified into the control channel (CCH) and the data channel (DCH). The down link control channel is for transmitting the broadcast information and the incoming information indicating the state of the base station to the mobile station. The up link control channel is used to request the call activation. The data channel is used for transmission and reception of the user data.

A method by which the base station transmits a signal by OFDM modulation is explained with reference to FIG. 38.

The transmission system, after primary modulation (16QAM, etc.) in the MOD unit 3801, converts the signal into the PN burst wave through the PN code generator 3802, performs the OFDM mapping in the MAP unit 3803, determines the beam forming in the BF unit 3804, performs the inverse fast Fourier transform into the OFDM signal in the IFFT unit 3805, and transmits the resulting signal through the RF 3806.

A method by which the base station receives the signal is explained with reference to FIG. 39. In the receiving system, the signal received through the antenna 3901 and the RF unit 3902 is subjected to fast Fourier transform by the FFT unit 3903 to demodulate the ODFM signal, and after inverse mapping of each symbol in the DEMAP unit 3904, the channel is estimated in the estimation units 3905 to 3908. Then, the primarily demodulated data is demodulated by the DEMOD unit 3909.

Incidentally, the receiving frequency bandwidth of the mobile station is assumed to be about 1.2 MHz.

[17. Control Information Transmission Frame]

The frame structure transmitted from the base station is such that each TDMA frame is formed of four slots each for transmission and reception and the same as the current PHS. The control information is transmitted in the same specified slot from each base station. In this specified slot, the control information is coded by a specified code in a specified frequency bandwidth. Further, the particular specified frequency bandwidth is repeated and distributed over the entire frequency band used in the system. The mobile station receives only the specified frequency band allotted in advance, and demodulates and receives the control information by the specified code.

Further, these control information, including the broadcast information and the paging information, is modulated by OFDM for each slot. As a result, the mobile station can receive the control information simply by having the ability to receive a specified frequency band.

The control information transmission scheme according to an embodiment is explained with reference to FIGS. 15 and 18. FIG. 15 shows the control channel transmission according to an embodiment of the invention. The direction of transmission from the base station is defined as the down link, and the direction of receiving by the base station as the up link. In FIG. 15, the frame is configured of four down link slots and four up link slots. According to this embodiment, a set of six frames is defined as a basic frame. The first slot of the head frame of this basic frame makes up a control channel transmission slot. Specifically, according to this embodiment, the control information is transmitted at the rate of once per 30 msec. A plurality of the control information are transmitted by regular repetition in this slot. The information to be transmitted include the broadcast information constituting the common control information (CCCH) for the system, the sync information required for frame synchronization, the paging information required for the incoming data and the check information for notifying the incoming data situation at the base station. These transmission information channels are defined as a broadcast information channel (BCCH), the paging information channel (PCH) and the incoming information channel (grant channel; GCH). These information are combined and transmitted in regular order. The minimum units of this repetition are defined as a superframe. The transmission slots other than those allotted to the control information are for transmitting the down link data information. The communication channel for data transmission is defined as the data channel. In view of the fact that the base station and the mobile station control the up link and down links, the information in the up link slot corresponding to the down link slot is received. Specifically, in the case where the base station transmits the information in the second slot, for example, the sixth slot constitutes the receiving slot. The up link slots corresponding to the down link data channel are assumed to be the up link data channel. Also, the up link slots corresponding to the down link common control channel receive the control information of the response from the mobile station as a special case. The channel for response is defined a response channel (access channel: ACH).

FIG. 18 shows a more detailed state of information transmission. According to this embodiment, the specified frequency band described above as a means for solving the problem is assumed to be 1.275 MHz and the entire band used for the system (hereinafter referred to as the system band) is assumed to be 20 MHz. This specified frequency band exists in 15 forms in the system band. For all the frequencies of the 15 bands, the base station transmits the same information as transmitted at the specified frequency. The control information transmits the data from each base station in the same specified slot, i.e. the first slot of the basic frame in the case under consideration. With this specified slot, the control information is coded by a specified code with a specified frequency bandwidth, and further, this specified frequency bandwidth of 1.275 MHz is repeated 15 times, so that the data is transmitted by distributing for the entire frequency band, i.e. 20 MHz used in the system. The mobile station receives only the specified frequency band 1.275 MHz allotted in advance, and receives by demodulating the control information by a specified code.

Further, these control information, including the broadcast information and the paging information, are modulated by OFDM for each slot. As a result, the mobile station can receive the control information simply by having the ability to receive the specified frequency band.

It should be further understood by those skilled in the art that although the foregoing description has been on embodiments of the invention, the invention is not limited thereto and various changes and modifications may be made without departing from the spirit of the invention and the scope of the appended claims.

The invention claimed is:

1. A wireless communication system comprising:
 a plurality of wireless mobile stations, and
 a wireless base station for conducting wireless communication with the plurality of wireless mobile station by a TDD wireless communication method based on an orthogonal frequency division multiple access (OFDMA) scheme;
 wherein a data signal, a pilot signal and an individual control signal which are sent/received between the wireless base station and the plurality of wireless mobile stations, is assigned to each of the plurality of wireless mobile stations in units of subchannel which is made by further dividing subband zones as divisions of a predetermined communicable system band;
 wherein the wireless base station indicates a specific code for each wireless mobile station of the plurality wireless mobile stations, and instructs each said wireless mobile station to transmit the pilot signal and the individual control signal coded by the specific code in all of whole said subband zones;
 wherein each said wireless mobile station of the plurality of wireless mobile stations transmits the data signal using a preassigned subchannel and transmits the pilot signal and the individual control signal coded by the instruction of the wireless base station, in all of the whole subband zones; and
 wherein the wireless base station includes a plurality of antennas, receives coded multiplexed pilot signals which are sent from the plurality of wireless mobile stations, estimates a propagation path of the each subchannel from the individual pilot signal of the plurality of wireless mobile stations demultiplexed by the code, to obtain an estimation result, and using the estimation result, determines an array weight used for wireless signal transmission to the wireless mobile station.

2. The wireless communication system according to claim 1,
 wherein the wireless base station transmits one packet to the wireless mobile station in a plurality of divisions in a plurality of sessions in such a manner that the subchannel transmitted is changed for each of the plurality of times of transmission, and a changed pattern is varied from one said wireless base station to another.

3. A wireless base station for conducting wireless communication with a plurality of wireless mobile stations by a TDD wireless communication method based on an orthogonal frequency division multiple access (OFDMA) scheme, comprising:
- a plurality of antennas;
- wherein the wireless base station is adapted to effect operations of:
- assigning a data signal, a pilot signal and an individual control signal which are to be sent/received between the wireless base station and the plurality of wireless mobile stations, to each wireless mobile station of the plurality of wireless mobile stations in units of subchannel which is made by further dividing subband zones as divisions of a predetermined communicable system band;
- instructing each said wireless base station: to transmit the data signal using a predetermined subchannel, and to indicate a specific code for said wireless mobile station for the pilot signal and the individual control signal; and make the pilot signal and the individual control signal be multiplexed and transmitted in all of a whole said subband zones, by instructing to transmit the pilot signal and the individual control signal coded with the specific code in all of the whole subband zones;
- receiving through the plurality of the antennas, transmitted signals which are composed by multiplexing transmission signals from the plurality of wireless mobile stations;
- demultiplexing the pilot signal and the individual control signal by the code from the received signals, and estimating the propagation path for each subchannel from the individual control signal of each of the plurality of wireless mobile stations, to obtain an estimation result; and
- determining the array weight used for signal transmission to the wireless mobile station using the estimation result.

4. The wireless base station according to claim 3 wherein one packet is transmitted to the wireless mobile station in a plurality of divisions in such a manner that the transmission subchannel is changed each time of the plurality of transmission, and a changed pattern is varied from one said wireless base station to another.

5. A communication method of a plurality of wireless mobile stations for conducting wireless communication with a wireless base station by a TDD wireless communication method based on an orthogonal frequency division multiple access (OFDMA) scheme;
- wherein a data signal, a pilot signal and an individual control signal which are sent/received between the wireless base station and the plurality of wireless mobile stations can be assigned to each wireless mobile station of the plurality of wireless mobile stations in units of subchannel which is made by further dividing subband zones as divisions of a predetermined communicable system band;
- wherein the wireless mobile station transmits the data signal using a preassigned subchannel codes by an instruction from the wireless base station and transmits the pilot signal and the individual control signal in a whole of said subband zones.

* * * * *